United States Patent
Theverapperuma et al.

(10) Patent No.: US 11,691,648 B2
(45) Date of Patent: Jul. 4, 2023

(54) DRIVABLE SURFACE IDENTIFICATION TECHNIQUES

(71) Applicant: SafeAI, Inc., Milpitas, CA (US)

(72) Inventors: Lalin Theverapperuma, Santa Clara, CA (US); Bibhrajit Halder, Sunnyvale, CA (US)

(73) Assignee: SafeAI, Inc., Milpitas, CA (US)

( * ) Notice: Subject to any disclaimer, the term of this patent is extended or adjusted under 35 U.S.C. 154(b) by 201 days.

(21) Appl. No.: 16/938,312

(22) Filed: Jul. 24, 2020

(65) Prior Publication Data

US 2022/0024485 A1 Jan. 27, 2022

(51) Int. Cl.
*B60W 60/00* (2020.01)
*B60W 40/06* (2012.01)
(Continued)

(52) U.S. Cl.
CPC ........ *B60W 60/0025* (2020.02); *B60W 40/06* (2013.01); *G01C 21/3407* (2013.01);
(Continued)

(58) Field of Classification Search
CPC ............. B60W 60/0025; B60W 40/06; B60W 2552/00; B60W 2420/42; G06V 10/462;
(Continued)

(56) References Cited

U.S. PATENT DOCUMENTS

2015/0294143 A1 10/2015 Wells et al.
2016/0227193 A1 8/2016 Osterwood et al.
(Continued)

FOREIGN PATENT DOCUMENTS

WO 2019043446 A1 3/2019

OTHER PUBLICATIONS

International Patent Application No. PCT/US2021/037110, International Search Report and Written Opinion dated Sep. 16, 2021, 14 pages.

(Continued)

*Primary Examiner* — Tyler J Lee
*Assistant Examiner* — Tiffany P Ohman
(74) *Attorney, Agent, or Firm* — Kilpatrick Townsend & Stockton LLP

(57) ABSTRACT

The present disclosure relates generally to identification of drivable surfaces in connection with autonomously performing various tasks at industrial work sites and, more particularly, to techniques for distinguishing drivable surfaces from non-drivable surfaces based on sensor data. A framework for the identification of drivable surfaces is provided for an autonomous machine to facilitate it to autonomously detect the presence of a drivable surface and to estimate, based on sensor data, attributes of the drivable surface such as road condition, road curvature, degree of inclination or declination, and the like. In certain embodiments, at least one camera image is processed to extract a set features from which surfaces and objects in a physical environment are identified, and to generate additional images for further processing. The additional images are combined with a 3D representation, derived from LIDAR or radar data, to generate an output representation indicating a drivable surface.

20 Claims, 13 Drawing Sheets

(51) Int. Cl.
*G01C 21/34* (2006.01)
*G06N 3/08* (2023.01)
*G06N 3/04* (2023.01)
*G06V 10/46* (2022.01)
*G06V 20/56* (2022.01)
*G06V 20/64* (2022.01)
*G06F 18/214* (2023.01)

(52) U.S. Cl.
CPC ........... *G06F 18/2148* (2023.01); *G06N 3/04* (2013.01); *G06N 3/08* (2013.01); *G06V 10/462* (2022.01); *G06V 20/588* (2022.01); *G06V 20/647* (2022.01); *B60W 2420/42* (2013.01); *B60W 2552/00* (2020.02)

(58) Field of Classification Search
CPC .. G06V 20/588; G06V 20/647; G06K 9/6257; G06N 3/04; G06N 3/08; G01C 21/3407
USPC .......................................................... 701/25
See application file for complete search history.

(56) References Cited

U.S. PATENT DOCUMENTS

| | | | |
|---|---|---|---|
| 2017/0010616 | A1 | 1/2017 | Shashua et al. |
| 2017/0148101 | A1 | 5/2017 | Franke et al. |
| 2018/0190014 | A1 | 7/2018 | Yarborough et al. |
| 2019/0079526 | A1 | 3/2019 | Vallespi-Gonzalez et al. |
| 2019/0147250 | A1 | 5/2019 | Zhang et al. |
| 2019/0176321 | A1 | 6/2019 | Afrouzi et al. |
| 2019/0266418 | A1 | 8/2019 | Xu et al. |
| 2019/0310636 | A1 | 10/2019 | Halder |
| 2020/0098135 | A1* | 3/2020 | Ganjineh ................. G06T 7/74 |
| 2020/0210726 | A1 | 7/2020 | Yang et al. |
| 2021/0278851 | A1* | 9/2021 | Van der Merwe ... B62D 15/025 |

OTHER PUBLICATIONS

U.S. Appl. No. 16/657,921, Non-Provisional Application as filed Oct. 18, 2019, 87 pages.

International Patent Application No. PCT/US2019/064776, International Search Report and Written Opinion dated Feb. 25, 2020, 9 pages.

* cited by examiner

DRIVABLE SURFACE IDENTIFICATION TECHNIQUES

TECHNICAL FIELD

The present disclosure relates generally to the operation of autonomous machinery to identify drivable surfaces in connection with performing various tasks at industrial work sites and, more particularly, to techniques for distinguishing drivable surfaces from non-drivable surfaces based on sensor data collected at such work sites.

BACKGROUND

Tasks performed at an industrial work site often involve navigating within the work site, for instance, to pick up an object from one location and move the object to another location. Unlike urban areas, roads and other drivable surfaces in industrial work sites are not always well-marked. For example, a drivable surface in a work site may not be paved (e.g., covered in asphalt) or marked in a way that enables the path of the drivable surface to be easily discerned (e.g., painted with lane markers, separated from non-drivable surfaces by raised curbs or sidewalks). Therefore, the use of cameras in conjunction with conventional computer vision techniques may not be sufficient to successfully identify drivable surfaces in all instances. Further, identification of drivable surfaces should take into consideration the presence of surface deformations or anomalies. Identifying the presence of surface deformations or anomalies is a distinct challenge in itself. In order to minimize the amount of manual control or supervision involved in operating autonomous machinery, it would be advantageous if the autonomous machinery were capable of identifying drivable surfaces and making autonomous decisions regarding navigation and performance of tasks involving the use of drivable surfaces.

BRIEF SUMMARY

The present disclosure relates generally to the operation of autonomous machinery to identify drivable surfaces in connection with performing various tasks at industrial work sites and, more particularly, to techniques for distinguishing drivable surfaces from non-drivable surfaces based on sensor data collected at such work sites. A framework for the identification of drivable surfaces is provided for an autonomous machine to facilitate it to autonomously detect the presence of a drivable surface and to estimate, based on sensor data, attributes of the drivable surface such as road condition, road curvature, degree of inclination or declination, and the like.

Various embodiments are described herein, including methods, systems, non-transitory computer-readable storage media storing programs, code, or instructions executable by one or more processors, and the like.

In certain embodiments, techniques are described for identifying a drivable surface based on sensor data, where the sensor data includes camera data in combination with LIDAR (Light Detection and Ranging) data and/or radar data. The sensor data is processed through a surface identification subsystem configured to detect various attributes of a physical environment surrounding an autonomous vehicle, including attributes of a drivable surface in the environment. For instance, the surface identification subsystem can include a plurality of modules configured to detect known objects in the environment, estimate the depth (e.g., distance from sensor) of surfaces, segment an image or other representation of the environment into different regions based on object class, and/or perform other processing of sensor data to generate information usable for making a decision as to whether a particular surface is drivable and for estimating the attributes of the particular surface.

In certain embodiments, at least some of the modules in the surface identification subsystem are implemented using a machine learning model (e.g., a convolutional neural network or CNN). The processing performed by the surface identification subsystem may involve generating, from the sensor data, disparate representations of the environment and combining information from the various representations into an output representation that indicates the locations of drivable surfaces, if any, and the attributes of such drivable surfaces. The output representation can be further processed to determine a plan of action for execution by an autonomous vehicle, for example, moving from one location to another along a path that crosses a drivable surface.

In certain embodiments, a method involves receiving, by a controller system of an autonomous vehicle, sensor data from a plurality of sensors. The sensor data comprises at least one camera image of a physical environment and a first three-dimensional (3D) representation of the physical environment. The method further involves extracting, by the controller system, a set of features from the at least one camera image. The extracting comprises inputting the at least one camera image to a neural network trained to infer values of the set of features from image data. The method further involves estimating, by the controller system and using the values of the set of features, depths of different locations in the physical environment; and generating, by the controller system, a depth image based on the estimated depths. The method further involves identifying, by the controller system and using the values of the set of features, boundaries of surfaces in the physical environment; and generating, by the controller system, a segmented image. The segmented image is divided into different regions, each region corresponding to an identified boundary of a surface in the physical environment. The method further involves determining, by the controller system and using the values of the set of features, that the physical environment includes at least one object belonging to a particular class in a plurality of object classes; and generating, by the controller system, an augmented image, the augmented image being augmented to indicate a boundary of the at least one object. The method further involves estimating, by the controller system and from the first 3D representation, at least one of a ground plane or a height of a particular surface in the physical environment; and generating, by the controller system and using the first 3D representation, a second 3D representation of the physical environment. The second 3D representation indicates a result of the estimating of at least one of the ground plane or the height of the particular surface in the physical environment. The method further involves generating, by the controller system and using the depth image, the segmented image, the augmented image, and the second 3D representation, an output representation indicating a drivable surface in the physical environment. The method further involves determining, by the controller system and based on the output representation, a plan of action for the autonomous vehicle, the plan of action involving autonomously navigating a path from a first location in the physical environment to a second location in the physical environment, where the path is at least partially located on the drivable surface; and executing, by the controller system, the plan of action.

In certain embodiments, a segmented image can include a region corresponding to an identified boundary of a drivable surface. In certain embodiments, an object determined to be in a physical environment may be located on a drivable surface. In certain embodiments, generating an output representation comprises inputting a depth image, a segmented image, an augmented image, and an second 3D representation into a neural network trained to infer values of the output representation using information from training data that includes a combination of two-dimensional and three-dimensional representations. In certain embodiments, a set of rules is applied to an output representation, where the set of rules includes at least one condition relating to an attribute of a surface under consideration for inclusion in the path from the first location to the second location. Based on the set of rules being satisfied, a determination is made that a surface under consideration is drivable.

In certain embodiments, generating an augmented image or a segmented image comprises inputting values of a set of features to a neural network trained using images of surface deformations associated with drivable surfaces. The images of surface deformations can include images of impressions made by vehicles onto drivable surfaces. Alternatively or additionally, in certain embodiments, the neural network is trained using images of surface deformations associated with non-drivable surfaces. The images of surface deformations associated with non-drivable surfaces can include images of cracks, rocks, debris, or pools of liquid.

In certain embodiments, a 3D representation is generated which indicates a ground plane that at least partially overlaps a drivable surface. In certain embodiments, a 3D representation is generated which comprises a grid in which the height of a particular surface in a physical environment is indicated by values assigned to grid locations corresponding to locations on the particular surface, and where the values assigned to the grid locations are values indicating that the grid locations are physically occupied or values indicating an estimated height of the particular surface at each grid location. For example, the 3D representation can be a voxel grid generated by inputting a first 3D representation into a neural network trained to infer whether a particular voxel in the voxel grid corresponds to a road surface.

In certain embodiments, values of a set of features extracted from at least one camera image are processed to identify an edge represented in the at least one camera image, where the identified edge corresponds to an edge of an object in a physical environment or an edge of a drivable surface.

The foregoing, together with other features and embodiments will become more apparent upon referring to the following specification, claims, and accompanying drawings.

BRIEF DESCRIPTION OF THE DRAWINGS

The present disclosure can be best understood by reference to the following description taken in conjunction with the accompanying figures, in which like parts may be referred to by like numerals.

DETAILED DESCRIPTION

Figure 1A:
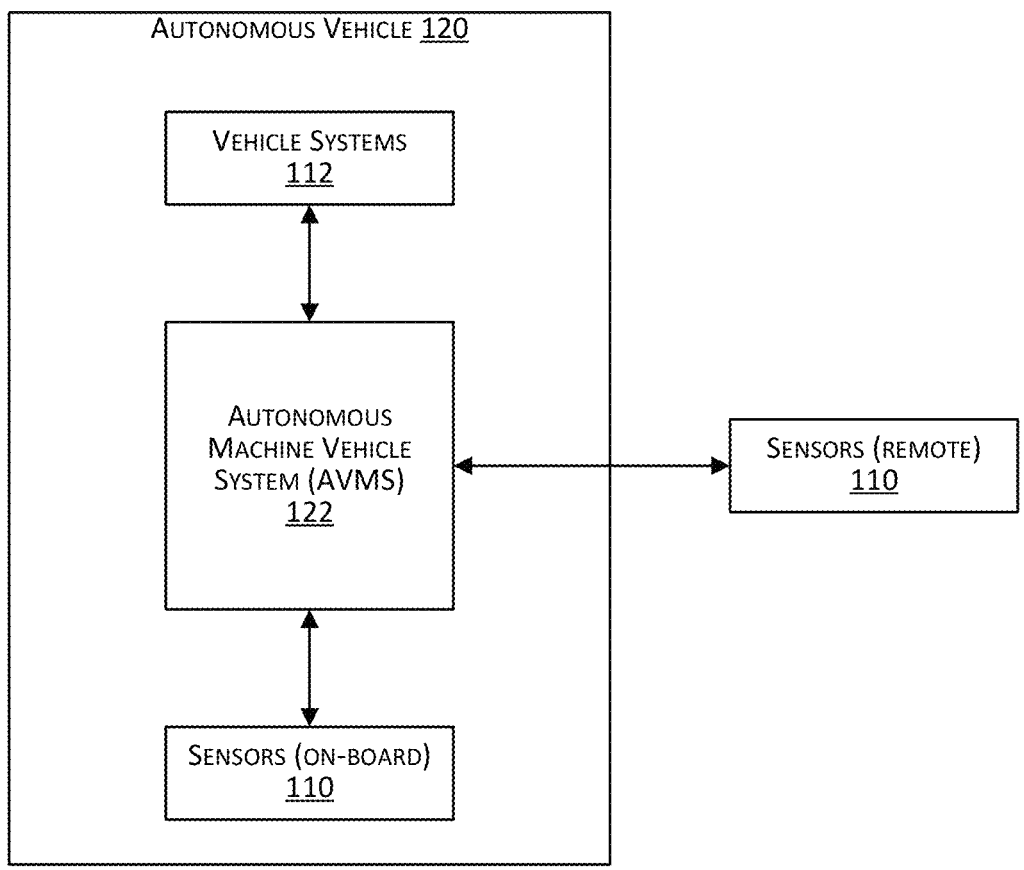
FIG. 1A is a simplified block diagram of an autonomous vehicle incorporating a controller system (referred to herein as an autonomous vehicle management system (AVMS)) according to certain embodiments.

Exemplary examples and embodiments of the present disclosure will now be described in detail with reference to the drawings, which are provided as illustrative examples so as to enable those skilled in the art to practice the disclosure. Notably, the figures and examples below are not meant to limit the scope of the present disclosure to a single embodiment, but other embodiments are possible by way of interchanges of or combinations of some or all of the described or illustrated elements. Wherever convenient, the same reference numbers will be used throughout the drawings to refer to the same or similar parts.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

The present disclosure relates generally to the operation of autonomous machinery to identify drivable surfaces in connection with performing various tasks at industrial work sites and, more particularly, to techniques for distinguishing drivable surfaces from non-drivable surfaces based on sensor data collected at such work sites. A framework for the identification of drivable surfaces is provided for an autonomous machine to facilitate it to autonomously detect the presence of a drivable surface and to estimate, based on sensor data, attributes of the drivable surface such as road condition, road curvature, degree of inclination or declination, and the like. The techniques described herein are applicable to work sites in various industries such as, construction, mining, manufacturing, warehousing, logistics, sorting, packaging, agriculture, etc.

The present disclosure describes several embodiments in the context of an autonomous vehicle. Although embodiments are described with respect to surfaces on land and are therefore applicable to land-based vehicles, the use of the term "vehicle" and description with respect to a vehicle is not intended to be limiting or restrictive. The teachings described herein can be used with and applied to any autonomous equipment, including autonomous vehicles and other types of autonomous machines that are configured to perform one or more tasks or operations in an automated manner, and substantially free of any human intervention.

Embodiments are described which involve detection of objects and detection of surfaces. Objects include surfaces (e.g., a pole includes a curved or cylindrical surface). However, in the context of driving an autonomous vehicle, the term "drivable surface" is used herein to refer to a surface that is at least large enough for the autonomous vehicle to drive on. Drivable surfaces include, for example, roads and paths through terrain.

Further, a drivable surface is a surface that is safe for driving. Whether a particular surface is safe for driving may depend on the vehicle to be driven. For example, in the context of land-based vehicles, a drivable surface may be a road that meets one or more conditions/criteria with respect to the attributes of the surface, and where at least some of the conditions vary depending on the attributes of the vehicle and/or its occupants or cargo, e.g., vehicle length, vehicle width, vehicle height, vehicle weight, tire size, wheelbase length, minimum turning radius, number of occupants, age of an occupant, type of material being transported (e.g., liquids, hazardous chemicals, dirt, mined ore), etc. Examples of such conditions include: the road being at least a threshold width (e.g., wider than the vehicle by a safety margin), the road being less steep than a threshold incline (e.g., does not exceed a grade of 30 degrees), and the road having no cracks, pools of liquid, or other anomalies larger than a certain size (e.g., no cracks or potholes larger than a certain width and/or length).

When viewed at a sufficiently large scale, a surface can include portions that are drivable and portions that are non-drivable. For instance, a road can include a first segment that is relatively free of cracks and a second segment that is severely cracked or obstructed (e.g., blocked by a stopped vehicle or a fallen log). Therefore, a planned route across the road could involve traveling at least some distance along the first segment and then avoiding at least some of the second segment, for example, by taking a detour along another path that bypasses the second segment. In general, a planned route may comprise a starting location, an end location, and a path across one or more drivable surfaces that connect the starting location to the end location.

FIG. 1A is a simplified block diagram of an autonomous vehicle 120 incorporating a controller system (referred to herein as autonomous vehicle management system (AVMS) 122) according to certain embodiments. For purposes of this disclosure, an autonomous vehicle, such as autonomous vehicle 120, is a vehicle that is capable of performing one or more operations autonomously and substantially free of any human user or manual input. For example, in certain embodiments, the autonomous operation may be the ability of the vehicle 120 to autonomously sense its environment and navigate or drive along a path autonomously and substantially free of any human user or manual input. Examples of other autonomous operations include, without limitation, scooping and dumping operations, moving materials or objects (e.g., moving dirt or sand from one area to another), lifting materials, driving, rolling, spreading dirt, excavating, transporting materials or objects from one point to another point, and the like.

Autonomous vehicle 120 can be of various different types. For example, autonomous vehicle 120 can be a car or mobile machine that can be used to transport people and/or cargo. Autonomous vehicle 120 can be a specialized vehicle for performing specialized operations such as road or path compacting, rolling, digging, lifting, etc. Examples of autonomous vehicle 120 include without restriction wagons, bicycles, motor vehicles (e.g., motorcycles, cars, trucks, buses), railed vehicles (e.g., trains, trams), watercrafts (e.g., ships, boats), aircrafts, spacecraft, and/or heavy equipment vehicles (e.g. dump trucks, tractors, bull dozers, excavators, forklifts, etc.). Since the environment of autonomous vehicle 120 can include other vehicles, including other autonomous vehicles, for purposes of clarity, in order to differentiate autonomous vehicle 120 from other vehicles in its environment, autonomous vehicle 120 is also sometimes referred to as the ego vehicle.

As depicted in FIG. 1A, in addition to autonomous vehicle management system 122, autonomous vehicle 120 may include or be coupled to sensors 110, and vehicle systems 112. Autonomous vehicle management system 122 may be communicatively coupled with sensors 110 and vehicle systems 112 via wired or wireless links. One or more different communication protocols may be used for facilitating communications between autonomous vehicle management system 122 and sensors 110 and between autonomous vehicle management system 122 and vehicle systems 112.

Vehicle systems 112 can include various electro-mechanical systems, components, linkages, etc. that enable autonomous vehicle 120 to perform its intended functions such as traveling or navigating along a particular path or course. Vehicle systems 112 may include for example, a steering system, a throttle system, a braking system, a propulsion system, etc. for driving the autonomous vehicle, electrical systems, auxiliary systems (e.g., systems for outputting information to a driver or passenger of autonomous vehicle 120), and the like. Vehicle systems 112 can be used to set the path and speed of autonomous vehicle 120. In an autonomous vehicle that is configured to perform a specialized operation (e.g., a dump truck that is specialized to perform lift and dump operations, a tractor, etc.), the vehicle systems 112 may also include systems that are configured to perform such specialized operations.

Sensors 110 may be located on or in autonomous vehicle 120 ("onboard sensors") or may even be located remotely ("remote sensors") from autonomous vehicle 120. Autonomous vehicle management system 122 may be communicatively coupled with remote sensors via wireless links using a wireless communication protocol. Sensors 110 can obtain environmental information for autonomous vehicle 120. This sensor data can then be fed to autonomous vehicle management system 122. Sensors 110 can include, without limitation, one or more instances of any of the following: LIDAR (Light Detection and Ranging) sensors, radar sensors, cameras (different kinds of cameras with different sensing capabilities may be used), a Global Positioning System (GPS) sensor, an Inertial Measurement Unit (IMU) sensor, Vehicle-to-everything (V2X) sensors, audio sensors, proximity (e.g., ultrasonic or infrared) sensors, and the like. Sensors 110 can obtain (e.g., sense, capture) environmental information for autonomous vehicle 120 and communicate the sensed or captured sensor data to autonomous vehicle management system 122 for processing.

Examples of radar sensors (e.g., long range radar, short range radar, imaging radar etc.) may include sensors that are used to detect objects in the environment of autonomous vehicle 120 and to determine the velocities of the detected objects. Examples of LIDAR sensors include sensors that use surveying techniques that measure distances to a target by using light in the form of a pulsed laser light. This is done by illuminating the target to be measured with pulsed laser light and measuring the reflected pulses using the sensor. Examples of V2X sensors include sensors that use V2X communication technology to communicate with moving parts of a traffic system. For example, autonomous vehicle 120 may use a V2X sensor for passing and/or receiving information from a vehicle to another entity around or near the autonomous vehicle. A V2X communication sensor/system may incorporate other more specific types of communication infrastructures such as V2I (Vehicle-to-Infrastructure), V2V (Vehicle-to-vehicle), V2P (Vehicle-to-Pedestrian), V2D (Vehicle-to-device), V2G (Vehicle-to-grid), and the like. An IMU sensor may be an electronic device that measures and reports a body's specific force, angular rate, and sometimes the magnetic field surrounding the body, using a combination of accelerometers, gyroscopes, magnetometers, etc. GPS sensors use a space-based satellite navigation system to determine geolocation and time information.

As will be described below, in certain embodiments, data obtained from different types of sensors or multiple instances of the same type of sensor may be processed to generate disparate representations of an environment surrounding an autonomous vehicle. The disparate representations may indicate different attributes of the environment that are relevant to identifying a drivable surface and can be combined to form an output representation indicating a drivable surface. For instance, the output representation can be a three-dimensional (3D) representation of the environment depicting the boundaries and contours of the drivable surface together with any objects that have been detected in the environment. Various types of sensor combinations may be employed for the purpose of obtaining data for generating the 3D representation. Combining different sensor types has certain advantages. For example, cameras are capable of generating highly detailed images of the environment the objects within it, whereas LIDAR and radar provide better depth perception. LIDAR is generally more accurate than radar when detecting stationary objects, whereas radar is more accurate at detecting moving objects.

Autonomous vehicle management system 122 (also referred to as a controller system) is configured to process data describing the state of autonomous vehicle 120 and the state of the autonomous vehicle's environment, and based upon the processing, control one or more autonomous functions or operations of autonomous vehicle 120. For example, autonomous vehicle management system 122 may issue instructions/commands to vehicle systems 112 to programmatically and autonomously control various aspects of the autonomous vehicle's motion such as the propulsion, braking, steering or navigation, and auxiliary behavior (e.g., turning lights on) functionality of autonomous vehicle 120. Autonomous vehicle management system 122 implements the control and planning algorithms that enable autonomous vehicle 120 to perform one or more operations autonomously.

Autonomous vehicle management system 122 may be implemented using software only, hardware only, or combinations thereof. The software may be stored on a non-transitory computer readable medium (e.g., on a memory device) and may be executed by one or more processors (e.g., by computer systems) to perform its functions. In the embodiment depicted in FIG. 1A, autonomous vehicle management system 122 is shown as being in or on autonomous vehicle 120. This is however not intended to be limiting. In alternative embodiments, autonomous vehicle management system 122 can also be remote from autonomous vehicle 120.

Autonomous vehicle management system 122 receives sensor data from sensors 110 on a periodic or on-demand basis. Autonomous vehicle management system 122 uses the sensor data received from sensors 110 to perceive the autonomous vehicle's surroundings and environment. Autonomous vehicle management system 122 uses the sensor data received from sensors 110 to generate and keep updated a digital model that encapsulates information about the state of autonomous vehicle and of the space and environment surrounding autonomous vehicle 120. This digital model may be referred to as an internal map, which encapsulates the current state of autonomous vehicle 120 and its environment. The internal map along with other information is then used by autonomous vehicle management system 122 to make decisions regarding actions (e.g., navigation, braking, acceleration, scooping, dumping, etc.) to be performed by autonomous vehicle 120. Autonomous vehicle management system 122 may send instructions or commands to vehicle systems 112 to cause the actions be performed by the systems of vehicles systems 112.

Figure 1B:
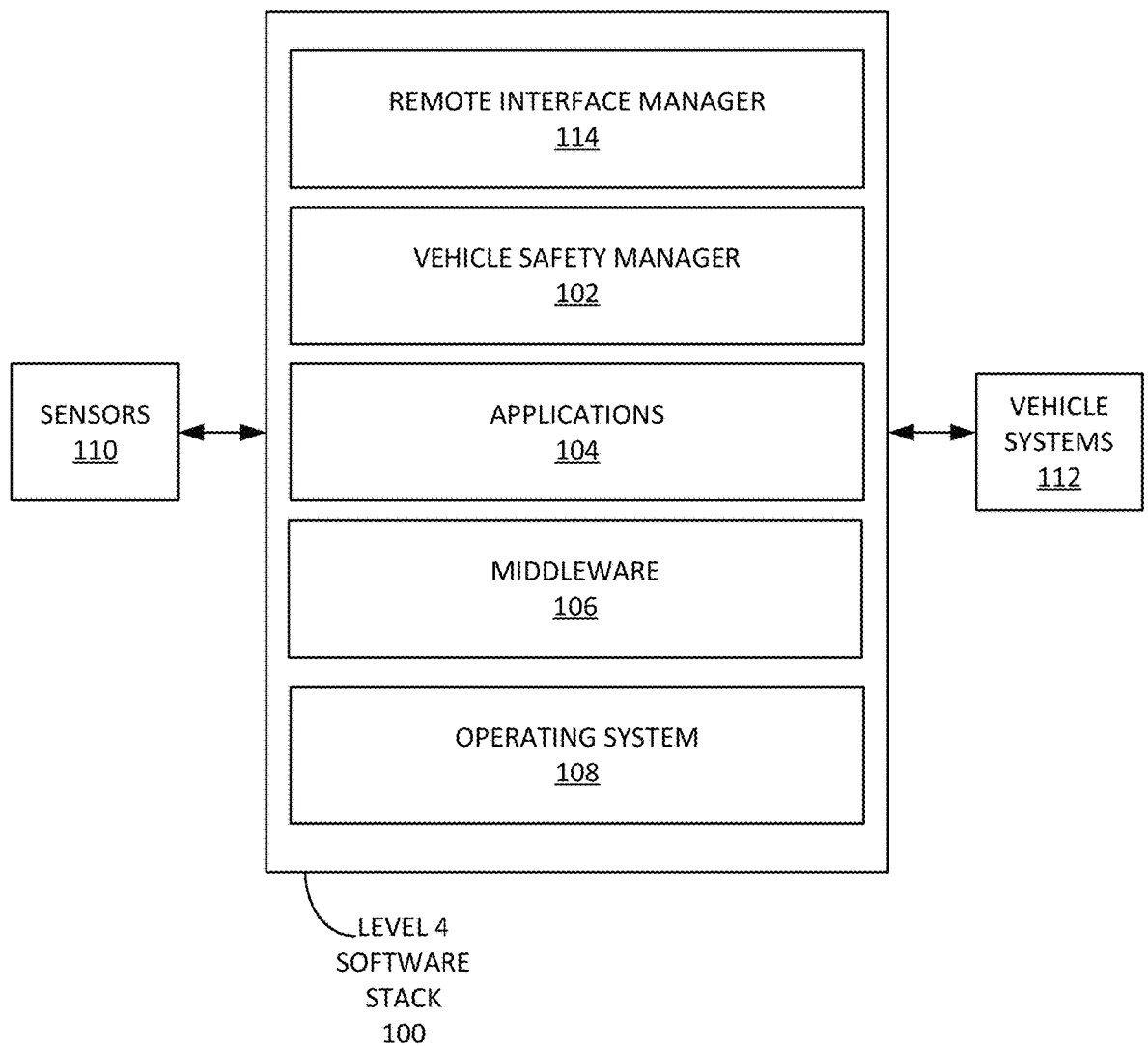
FIG. 1B depicts an example autonomous vehicle management system implemented primarily in software, according to some embodiments.

As indicated above, autonomous vehicle management system 122 may be implemented using software only, hardware only, or combinations thereof. FIG. 1B depicts an example autonomous vehicle management system 122 according to some embodiments. Autonomous vehicle management system 122 is implemented primarily in software and, in particular, may be implemented as a fully autonomous vehicle software stack 100. Fully autonomous vehicle software stack 100 can include a vehicle safety manager 102, a remote interface manager 114, applications 104, middleware 106, and operating system 108. Fully autonomous vehicle software stack 100 may be used to implement the functionalities of the various systems and subsystems described above.

Figure 2A:
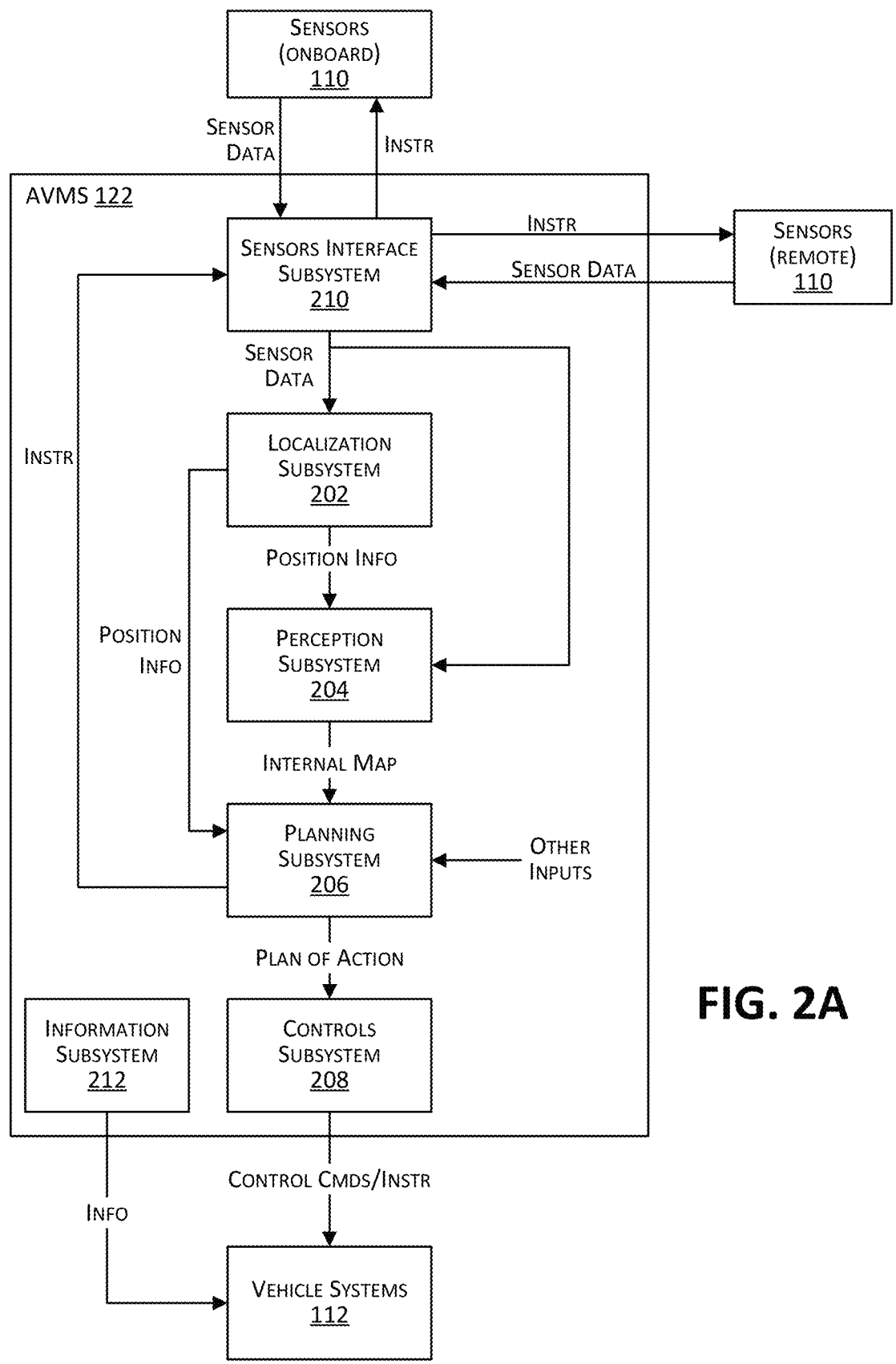
FIG. 2A is a simplified block diagram depicting subsystems of an autonomous vehicle management system according to certain embodiments.

FIG. 2A is a simplified block diagram depicting subsystems of autonomous vehicle management system 122 according to certain embodiments. Autonomous vehicle management system 122 may comprise multiple systems or subsystems communicatively coupled to each other via one or more communication channels. In the embodiment depicted in FIG. 2A, the subsystems include a sensors interface subsystem 210, a localization subsystem 202, a perception subsystem 204, a planning subsystem 206, a controls subsystem 208, and an information subsystem 212.

Autonomous vehicle management system 122 embodiment depicted in FIG. 2A is merely an example and is not intended to unduly limit the scope of claimed embodiments. One of ordinary skill in the art would recognize many possible variations, alternatives, and modifications. For example, in some implementations, autonomous vehicle management system 122 may have more or fewer subsystems or components than those shown in FIG. 2A, may combine two or more subsystems, or may have a different configuration or arrangement of subsystems. The subsystems may be implemented using software only, hardware only, or combinations thereof. In the embodiment depicted in FIG. 2A, autonomous vehicle management system 122 and all its subsystems are shown as being in or on autonomous vehicle 120. This is however not intended to be limiting. In alternative embodiments, all the subsystems of autonomous vehicle management system 122 or certain subsystems of autonomous vehicle management system 122 can also be remote from autonomous vehicle 120.

Sensors interface subsystem 210 provides an interface that enables communications between sensors 110 (including on-board sensors and remote sensors) and autonomous vehicle management system 122. Sensors interface subsystem 210 may receive sensor data from sensors 110 and provide the data to one or more other subsystems of autonomous vehicle management system 122. For example, as depicted in FIG. 2A, sensor data may be provided to localization subsystem 202 and perception subsystem 204 for further processing. The sensor data collected by the various sensors 110 enables autonomous vehicle management system 122 to construct a view or picture of autonomous vehicle 120 and its surrounding environment.

In certain embodiments, autonomous vehicle management system 122 enables one or more subsystems of autonomous vehicle management system 122 to send instructions or commands to one or more sensors 110 to control the operations of the one or more sensors. For example, instructions may be sent to a particular sensor to change the behavior of the particular sensor. For example, instructions may be sent to a sensor to change the information sensed or collected by the sensor and/or to change the sensor data communicated from the sensor to autonomous vehicle management system 122. Using these instructions, autonomous vehicle management system 122 can dynamically control the sensor data that is communicated from sensors 110 to autonomous vehicle management system 122. Further details on this are provided below in the context of functions performed by planning subsystem 206.

Localization subsystem 202 is configured to receive sensor data from sensors 110, and based upon the sensor data, identify the location of autonomous vehicle 120 in its surrounding environment (vehicle localization). Localization subsystem 202 provides current, local position information of the ego vehicle with respect to its environment (example: mine). The position of the ego vehicle 120 may be determined with respect to a pre-defined map that is generated by perception subsystem 204. In certain embodiments, localization subsystem 202 is configured to broadcast the ego vehicle's position information to other systems or subsystems of autonomous vehicle 120. The other systems or subsystems may then use the position information as needed for their own processing.

Localization subsystem 202 may implement various functions such as internal map management, map matching, visual odometry, dead reckoning, location history management, and the like. For example, assume that autonomous vehicle 120 is driving in a mine. Localization subsystem 202 may receive as input a map of the mine. A mine usually has a set path comprising drivable and non-drivable areas and a set road for mining vehicles to follow around a mine. Localization subsystem 202 may determine the position of the ego vehicle along the path. Localization subsystem 202 may do so by utilizing multiple inputs it receives from sensors and maps of the environment. Localization subsystem 202 may use GPS sensor data to determine the global positioning of the ego vehicle. Localization subsystem 202 may receive the GPS sensor data and translate it to a more useful form that is usable by one or more other subsystems of autonomous vehicle management system 122. For example, information, localization subsystem 202 may identify where the ego vehicle is positioned with respect to a map of the environment, such as a mine map (also referred to as map management).

Localization subsystem 202 may also be configured to perform map matching, where what localization subsystem 202 perceives is matched with the information that it has. Map matching can match recorded geographic coordinates to a logical model of the real world, (e.g., using a Geographic Information System (GPS), etc.). In one example, a map matching algorithm can obtain recorded, serial location points (e.g. from GPS) and relate them to edges in an existing street graph (e.g., as a network). This can be in a sorted list representing the travel of an autonomous vehicle. As part of map matching, localization subsystem 202 is tracking the ego vehicle in its environment and deducing its position based on what localization subsystem 202 sees relative to a map, such as a real world map.

Localization subsystem 202 is also configured to perform visual odometry, which involves determining the orientation and position of the ego vehicle based upon sensor data, such as by analyzing images captured by one or more cameras.

Localization subsystem 202 may also perform dead reckoning processing. Dead reckoning is the process of calculating one's current position by using a previously determined position, or fix, and advancing that position based upon known or estimated speeds over elapsed time and course. This may involve calculating the ego vehicle's position by estimating the direction and distance travelled. For example, autonomous vehicle management system 122 receives and knows certain information about autonomous vehicle 120 such as it wheel speed, steering angle, where autonomous vehicle 120 was a second ago, and the like. Based on the past position information and in combination with speed/steering angle etc., localization subsystem 202 can determine the vehicle's next location or current location. This provides local understanding of the ego vehicle's position as it moves on its path. A path can be a road, highway, rail system, runway, boat route, bike path, etc., according to various embodiments.

Localization subsystem 202 may also perform local history management tracking, where historical information about the ego vehicle's path is analyzed and compared to the current path. For example, if autonomous vehicle 120 drives around a certain path in a mine many number of times, this information can be compared and analyzed by localization subsystem 202.

Localization subsystem 202 may also implement a consistency module that is configured to perform rationality checks, deficiency checks, normalize sensor data, etc. For example, localization subsystem 202 may receive information from different sources of information regarding the ego vehicle's position, location, etc. A rationality check may be used to do a validity check to make sure information from various sensors is consistent and robust. This helps reduce erroneous results. The rationality check can include tests to evaluate whether a sensor data value and/or the result of a calculation can possibly be true. The sensor data received from sensors 110 can also be normalized and the normalized sensor data then provided to localization subsystem 202. Localization subsystem 202 can then utilize the normalized sensor data to generate and/or update the consistent internal map of the real-time (e.g., assuming networking and processing latencies, etc.) environment of the autonomous vehicle.

Perception subsystem 204, periodically or on-demand, receives sensor data from sensors 110 and builds and maintains a consistent internal map based upon the received information. Perception subsystem 204 may also receive inputs from other sources, such as from localization subsystem 202, and use the received inputs to build and maintain the internal map. The internal map generated by perception subsystem 204 contains all the information including the ego vehicle's information, state of the ego vehicle and its environment, information about objects in the ego vehicle's environment (e.g., information regarding dynamic and static objects around ego vehicle). Consistent internal map can be a localized map of sensed entities/objects in the autonomous vehicle's environment, for example, around the autonomous vehicle. In certain embodiments, these sensed entities/objects are mapped in three dimensions (3D). In certain embodiments, perception subsystem 204 receives position information from localization subsystem 202 and incorporates the position information in the internal map. The internal map can be maintained even in the event that a sensor falls offline.

Rationality checks and normalization may be performed on the sensor data received by perception subsystem 204. These checks can include tests to evaluate whether a sensor data value and/or the result of a calculation can possibly be true. The sensor data received from sensors 110 can also be normalized and the normalized sensor data then provided to perception subsystem 204. Perception subsystem 204 can then utilize the normalized sensor data to generate and/or update the consistent internal map of the real-time environment of the autonomous vehicle.

Perception subsystem 204 may use various different algorithms and techniques to perform its functions, including artificial intelligence (AI) and machine learning based techniques. For example, perception subsystem 204 may use a convolutional neural network (CNN) to perform object detection and object classification based upon the sensor data. During a training phase, the CNN may be trained using labeled training data comprising sample images of a vehicle's environment and corresponding ground truth classifications. Labeled data generally includes a group of samples that have been tagged with one or more labels, where the labels represent known results (e.g., ground truth classification, etc.) for the training input samples. Labeling can also be used to take a set of unlabeled data and augment each piece of that unlabeled data with meaningful tags that are informative. A CNN model or other AI/machine learning model built based upon training may then be used in real time to identify and classify objects in the environment of autonomous vehicle 120 based upon new sensor data received from sensors 110.

Planning subsystem 206 is configured to generate a plan of action for autonomous vehicle 120. The plan may comprise one or more planned actions or operations to be performed by autonomous vehicle 120. For example, the plan may comprise information identifying a trajectory or path to be traversed by autonomous vehicle 120. A path can be a road, highway, rail system, runway, boat route, bike path, etc., according to various embodiments. For example, the trajectory information may indicate how the vehicle should move from point A to point B with a list of points between point A point B marking a trajectory for the vehicle to follow from point A to point B. As another example, the plan generated by planning subsystem 206 may include planned actions with respect to accessories of autonomous vehicle 120, such as turning indicators or lights on or off, producing one or more sounds (e.g., alarms), and the like. In situations where autonomous vehicle 120 has specialized components that are customized to perform specialized operations, the plan generated by planning subsystem 206 may also include planned actions to be performed by one or more of these specialized components. For example, if the autonomous vehicle is a digging truck with a bucket and arm assembly for performing the digging and moving of materials, the plan generated by planning subsystem 206 can include actions to be performed by the bucket and arm assembly for performing the digging. For example, the plan may include an angle at which the arm should be raised and or the angle of the bucket with respect to the arm. After a plan of action has been generated, planning subsystem 206 may communicate the plan of action to controls subsystem 208, which may then control one or more systems of vehicle systems 112 to cause the planned actions in the plan of action to be performed in a safe manner by autonomous vehicle 120.

In addition to the internal map generated by perception subsystem 204, planning subsystem 206 may also receive various other inputs that it uses in generating the plan of action for autonomous vehicle 120. These inputs may include, without limitation: (a) Position or localization information received from localization subsystem 202. (b) Information identifying one or more goals of autonomous vehicle 120 (e.g., information may be received identifying a final goal of autonomous vehicle 120 to make a right turn). The goal may be set by an end user or operator of the autonomous vehicle or machine. For an automotive example, the user may set a high level to drive from the current location of autonomous vehicle 120 to a particular final destination. Autonomous vehicle 120 may determine a GPS route plan based upon the current and final destination locations and with a goal to autonomously drive from the current location to the final destination according to the GPS route plan. In a mining environment example, a high level goal set by an operator may be to move ten tons of material (e.g., sand, coal, etc.) from point A and dump the material at point B. In general, one or more different goals may be provided. Examples of categories of goals (some of which may overlap) include, without limitation: goals related to performing an autonomous operation by the autonomous vehicle (e.g., autonomous driving or navigation along a path, scooping and dumping operations, moving materials or objects, lifting materials, driving, rolling, spreading dirt, excavating, transporting materials or objects from one point to another point, etc.), goals related to maneuvering the vehicle, goals related to interaction of the vehicle with various actors, objects, etc. in the vehicle's environment, goals related to the general operations of the vehicles, and the like. Examples of goals: changing lanes, driving from one location to another location, driving to a destination as fast as possible, making a turn, performing a series of steps in a sequence, and others. (c) High level route information regarding the path or route to be taken by autonomous vehicle 120. This may be provided directly or indirectly by an end user or operator of the autonomous vehicle. (d) Information identifying safety considerations. These may also be provided to the autonomous vehicle by an end user/operator, etc. using APIs provided by autonomous vehicle 120 or via metadata configured for autonomous vehicle 120. Examples of these considerations include, without limitation: always stay within the lane, maintain certain distance from any object at all time, a dump truck is not to make more than a 30 degree turn, a loader B is not to climb over a grade more than 15 degrees, etc. (e) Information about how a particular operation was performed in the past. For example, for a particular autonomous vehicle, this could be the past history of how that particular autonomous vehicle performed the operation in the past, how a different autonomous vehicle performed the operation in the past, how the operation was manually performed using a vehicle in the past (e.g., how a driver/operator performed the operation in the past with the vehicle operating under the driver/operator's control). For example, the autonomous vehicle traveled a path in the past, how a manual truck would have driven this path or completed a certain task, and the like. (f) Other inputs.

Based upon the one or more inputs, planning subsystem 206 generates a plan of action for autonomous vehicle 120. Planning subsystem 206 may update the plan on a periodic basis as the environment of autonomous vehicle 120 changes, as the goals to be performed by autonomous vehicle 120 change, or in general, responsive to changes in any of the inputs to planning subsystem 206.

As part of generating and updating the plan of action, planning subsystem 206 makes various decisions regarding which actions to include in the plan in order to achieve a particular goal in a safe manner. Processing performed by planning subsystem 206 as part of making these decisions may include behavior planning, global planning, path planning, fail-safe path, path history tracking, etc.

Planning subsystem 206 may use various AI-based machine-learning algorithms to generate and update the plan of action in order to achieve the goal of performing a function or operation (e.g., autonomous driving or navigation, digging of an area) to be performed by autonomous vehicle 120 in a safe manner. For example, in certain embodiments, planning subsystem 206 may use a model trained using reinforcement learning (RL) for generating and updating the plan of action. Autonomous vehicle management system 122 may use an RL model to select actions to be performed for controlling an autonomous operation of autonomous vehicle 120. The RL model may be periodically updated to increase its coverage and accuracy. Reinforcement learning (RL) is an area of machine learning inspired by behaviorist psychology, concerned with how agents ought to take actions in an environment so as to maximize some notion of cumulative reward.

In certain embodiments, in addition to generating a plan of action, planning subsystem 206 is capable of dynamically controlling the behavior of sensors 110. For example, planning subsystem 206 can send instructions or commands to a particular sensor from sensors 110 to dynamically control the sensor data that is captured by the particular sensor and/or control the sensor data that is communicated from the sensor to perception subsystem 204 (or to other subsystems of autonomous vehicle management system 122, such as to localization subsystem 202). Since the internal map built by perception subsystem 204 is based upon the sensor data received by perception subsystem 204 from the sensors, by being able to dynamically control the sensor data received from the sensors, the information included in and/or used by perception subsystem 204 to build and maintain the internal map can also be dynamically controlled by planning subsystem 206. Planning subsystem 206 can dynamically and on-demand direct sensors 110 to obtain specific types of information or behave in specified manners, for example, to provide additional sensor data to update the consistent internal map. For example, planning subsystem 206 can command a LIDAR sensor to narrow its range of sensing from a three-hundred and sixty-degree (360°) view to a narrower range that includes a specific object to be sensed and/or tracked in greater detail by the LIDAR system. In this way, the consistent internal map is updated based on feedback from and under the control of planning subsystem 206.

Autonomous vehicle management system 122 provides an infrastructure that enables planning subsystem 206 (or other subsystems of autonomous vehicle management system 122) to send one or more instructions or commands to one or more sensors to control the behavior of those one or more sensors. In the embodiment depicted in FIG. 2A, sensors interface subsystem 210 provides an interface for interacting with sensors 110. In the outbound direction (from autonomous vehicle management system 122 to the sensors direction), planning subsystem 206 can send an instruction or command to sensors interface subsystem 210. Sensors interface subsystem 210 is then configured to communicate the received instruction to the intended destination sensor. In the inbound direction (from a sensor to autonomous vehicle management system 122), sensors interface subsystem 210 may receive sensor data from a sensor in response to the instruction sent from planning subsystem 206. Sensors interface subsystem 210 may then communicate the received sensor data to planning subsystem 206 (or to the appropriate subsystem of autonomous vehicle management system 122 which originated the instruction).

Sensors interface subsystem 210 may be capable of communicating with different sensors using one or more different communication protocols. In certain embodiments, in the outbound direction, for an instruction or command received from planning subsystem 206 (or from any other subsystem of autonomous vehicle management system 122) and to be sent to a particular sensor, sensors interface subsystem 210 may translate the instruction to a format that is understandable by and appropriate for communicating with that particular sensor and then use a particular communication protocol that is applicable for that particular sensor.

In certain embodiments, autonomous vehicle management system 122 may have access to information identifying sensors 110 and their capabilities. The subsystems of autonomous vehicle management system 122 may then access and use this stored information to determine the possible capabilities and behaviors of a sensor and to send instructions to that sensor to change its behavior. In certain embodiments, a sensor has to be registered with autonomous vehicle management system 122 before communications that enables between the sensor and autonomous vehicle management system 122. As part of the registration process, for a sensor being registered, information related to the sensor may be provided. This information may include information identifying the sensor, the sensor's sensing capabilities and behaviors, communication protocol(s) usable by the sensor, and other information related to the sensor. Autonomous vehicle management system 122 may then use this information to communicate with and control the behavior of the sensor.

As indicated above, planning subsystem 206 may send instructions to a sensor to control and change the sensor's behavior. Changes in a sensor's behavior can include changing the sensor data that is communicated from the sensor to autonomous vehicle management system 122 (e.g. the sensor data communicated from the sensor to perception subsystem 204, or other subsystems of autonomous vehicle management system 122), changing the data that is collected or sensed by the sensor, or combinations thereof. For example, changing the sensor data that is communicated from the sensor to autonomous vehicle management system 122 can include communicating more or less data than what was communicated from the sensor to autonomous vehicle management system 122 prior to receiving the instruction, and/or changing the type of sensor data that is communicated from the sensor to autonomous vehicle management system 122. In some instances, the data sensed or collected by the sensor may remain the same but the sensor data communicated from the sensor to autonomous vehicle management system 122 may change. In other instances, the data sensed or collected by the sensor may itself be changed in response to an instruction received from autonomous vehicle management system 122. Planning subsystem 206 may also be able to turn a sensor on or off by sending appropriate instructions to the sensor.

For example, planning subsystem 206 may receive inputs including a current internal map generated by perception subsystem 204, position information from localization subsystem 202, and a goal that autonomous vehicle 120 is to make a turn in a certain amount of time (e.g., a right turn in the next 5 seconds). As part of deciding what is the best set of actions to be taken by autonomous vehicle 120 to achieve the goal in a safe manner, planning subsystem 206 may determine that it needs particular sensor data (e.g., additional images) showing the environment on the right side of autonomous vehicle 120. Planning subsystem 206 may then determine the one or more sensors (e.g., cameras) that are capable of providing the particular sensor data (e.g., images of the environment on the right side of autonomous vehicle 120). Planning subsystem 206 may then send instructions to these one or more sensors to cause them to change their behavior such that the one or more sensors capture and communicate the particular sensor data to autonomous vehicle management system 122 (e.g., to perception subsystem 204). Perception subsystem 204 may use this specific sensor data to update the internal map. The updated internal map may then be used by planning subsystem 206 to make decisions regarding the appropriate actions to be included in the plan of action for autonomous vehicle 120. After the right turn has been successfully made by autonomous vehicle 120, planning subsystem 206 may send another instruction instructing the same camera(s) to go back to communicating a different, possibly reduced, level of sensor data to autonomous vehicle management system 122. In this manner, the sensor data that is used to build the internal map can be dynamically changed.

Examples of changes in a sensor's behavior caused by an instruction received by the sensor from autonomous vehicle management system 122 may include, without limitation:

Cause a sensor to reduce, or even shut off, sensor data that is communicated from the sensor to autonomous vehicle management system 122. This may be done, for example, to reduce the high volume of sensor data received by autonomous vehicle management system 122. Using the same example from above, where planning subsystem 206 receives an input indicating that a goal of the autonomous vehicle 120 is to make a right turn, planning subsystem 206 may decide that it requires reduced sensor data with respect to the left environment of autonomous vehicle 120. Planning subsystem 206 may then determine the one or more sensors (e.g., cameras) that are responsible for communicating the sensor data that is to be reduced. Planning subsystem 206 may then send instructions to these one or more sensors to cause them to change their behavior such that the amount of sensor data communicated from these sensors to autonomous vehicle management system 122 (e.g., to perception subsystem 204) is reduced. As an example, the instructions sent from the planning subsystem 206 may do one or more of the following:

Cause a sensor to change its field of view. For example, causing a camera or a LIDAR sensor to zoom in to a narrow location.

Cause a sensor to only send partial information. For example, the sensor may send less than all the information captured by the sensor.

Cause a sensor to send information faster or slower than before or than a regular rate.

Cause a sensor to turn on.

Cause a sensor to capture and/or send information to autonomous vehicle management system 122 at a different resolution or granularity than before.

Figure 2B:
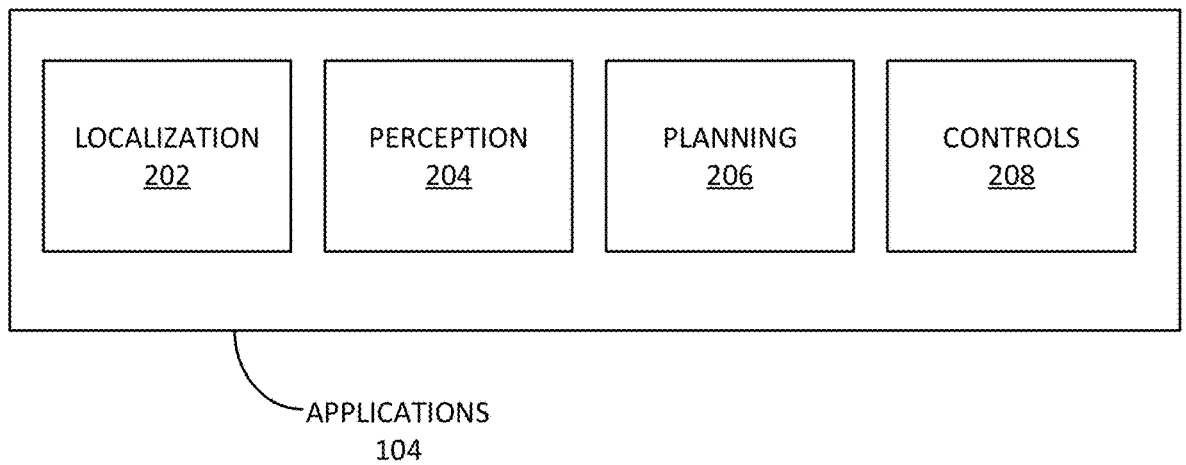
FIG. 2B illustrates software modules (e.g., program, code, or instructions executable by one or more processors of an autonomous machine) that may be used to implement the various subsystems of an autonomous vehicle management system according to certain embodiments.

FIG. 2B illustrates software modules (e.g., program, code, or instructions executable by one or more processors of autonomous vehicle 120) that may be used to implement the various subsystems of autonomous vehicle management system 122 according to certain embodiments. The software modules may be stored on a non-transitory computer medium. As needed, one or more of the modules or executable images of the modules may be loaded into system memory (e.g., RAM) and executed by one or more processors of autonomous vehicle 120. In the example depicted in FIG. 2B, software modules are shown for implementing localization subsystem 202, perception subsystem 204, planning subsystem 206, and controls subsystem 208.

Figure 3:
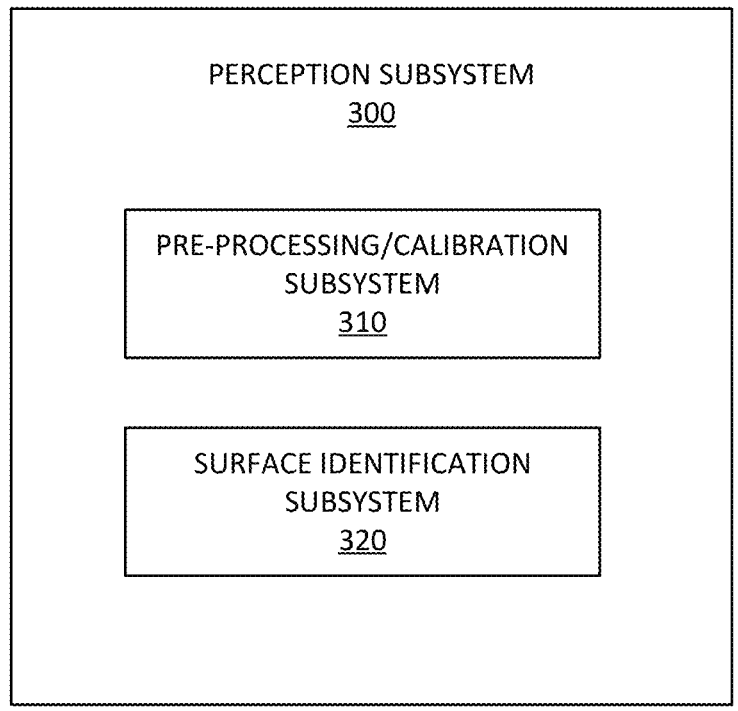
FIG. 3 is a simplified block diagram of a perception subsystem in an autonomous vehicle according to certain embodiments.

FIG. 3 is a simplified block diagram of a perception subsystem 300 in an autonomous machine (e.g., autonomous vehicle 120) according to certain embodiments. The perception subsystem 300 can be used to implement the perception subsystem 204 in FIG. 2A. As depicted in FIG. 3, the perception subsystem 300 may include a pre-processing subsystem 310 and a surface identification subsystem 320. The pre-processing subsystem 310 and the surface identification subsystem 320 can be implemented in software only, hardware only, or combinations thereof. The perception subsystem 300 depicted in FIG. 3 is merely an example. One of ordinary skill in the art would recognize many possible variations, alternatives, and modifications. For example, in some implementations, perception subsystem 300 may have more or fewer subsystems or components than those shown in FIG. 3, may combine two or more subsystems, or may have a different configuration or arrangement of subsystems.

Pre-processing subsystem 310 is configured to condition and/or reformat obtained sensor data in preparation for further processing by the surface identification subsystem 320. Formatting may involve transforming data produced by one sensor and data produced by a second sensor into a shared format and/or shared frame of reference. For example, sensors may capture data at different rates (e.g., two cameras capturing data at different frames per second, or a radar sensor operating at a different frequency than a LIDAR sensor). Thus, as part of the processing performed by the pre-processing subsystem 310, data captured from sensors operating at different rates may be reformatted so as to enable the sensor data to subsequently be combined in a coherent manner, e.g., merging or grouping together of data captured by different sensors but corresponding to the same time period. As another example, sensors may be located at different places (e.g., different locations on a body of the autonomous vehicle) and/or oriented differently (e.g., two cameras pointed in slightly different directions for generating stereoscopic images). If a first sensor captures an object in a particular position and a second sensor captures the same object in different position (e.g., due to a difference in the perspective of the second sensor relative to the first sensor), pre-processing subsystem 310 may perform a geometric correction to ensure that the object is represented in the sensor data from both sensors as a single object and not two separate objects.

Conditioning of sensor data may involve any number of operations that improve the quality of the sensor data. The conditioning may vary depending on the type of sensor. For example, camera pre-processing may involve image size or resolution adjustments (e.g., to scale down a large image to a smaller size for faster downstream processing) and corrective image processing (e.g., lens correction, aberration correction, white balancing, aperture correction, and the like). Camera pre-processing may also involve combining different images into a single image (e.g., as an average of a set of images). Other types of conditioning operations include operations to eliminate noise or unneeded information (e.g., cropping of images, eliminating LIDAR data captured outside of a certain field of view, removing data corresponding to objects or regions that are not of interest (e.g., the ground), etc.).

Pre-processing subsystem 310 may also be configured to perform calibration of sensors to change the sensor behavior and/to compensate for non-ideal sensor behavior. Examples of changing the behavior of a LIDAR or radar sensor include adjusting a reflectivity parameter to change the operating range of the LIDAR/radar sensor (e.g., to prevent capturing of data beyond a certain distance when an object of interest, such as a pile of material, is known to be less than that distance away from the vehicle) and changing the field of view captured by the LIDAR/radar sensor (e.g., from 360 degrees to 270 degrees). An example of a corrective camera calibration is the estimation of parameters for a lens and/or image sensor in a camera to enable the estimated parameters to be used to correct for lens distortion during subsequent image capture. Thus, pre-processing can involve operations performed prior to capturing sensor data as well as post-capture operations. Calibration can include intrinsic calibrations (e.g., adjusting the behavior of a sensor based on data captured by the same sensor) and/or extrinsic calibrations (e.g., adjusting the behavior of a sensor based on data from another sensor).

In certain embodiments, calibration of a camera involves calculating an extrinsic matrix for the camera. The extrinsic matrix represents the camera's pose and is a transformation matrix comprising values indicating a geometric transformation (e.g., translation and/or rotation) needed to map the camera's frame of reference to some other frame of reference (e.g., the reference frame of a LIDAR sensor). The extrinsic matrix can be calculated as a 3×4 matrix using a checkerboard calibration technique, in which a 3D calibration rig featuring a checkerboard pattern is placed within view of the camera and then captured to determine matrix parameters that map a point or feature in the checkerboard image to a corresponding point or feature in the other frame of reference. For example, a corner of the calibration rig as represented in the checkerboard image can be mapped to a corner of the calibration rig as represented in a point cloud generated by a LIDAR sensor. The calculation of the extrinsic matrix can be performed as a one-time setup involving the use of a perspective-n-point (PnP) algorithm that estimates the camera pose given a set of n number of 3D points and their corresponding two-dimensional (2D) projections in a camera image. Once calculated, the extrinsic matrix can be used to combine data from a camera with data from another sensor, for example, to merge 2D camera images with 3D data from other sensors (e.g., LIDAR point clouds) or to merge 2D camera images from two different cameras to form a depth image based on a disparity between the camera images.

Surface identification subsystem 320 is configured to receive the pre-processed sensor data from the pre-processing subsystem 310 and to determine which portions of the sensor data correspond to a drivable surface or a class of object. Surface identification subsystem 320 may partition sensor data into segments, where each segment is represented by an enclosed 2D or 3D boundary. For example, segmenting a 2D image captured by a camera may involve generating a border around a group of pixels based on determining that the pixels belong to the same object (e.g., a pole or traffic sign). In the case of a road surface, the segmenting performed by the surface identification subsystem 320 may involve generating a border around a group of pixels along the edges of the road. Segmentation is typically performed concurrently with classification (determining the class of each segment). The process of dividing an input representation into segments of one or more classes is sometimes referred to as semantic segmentation. Semantic segmentation can be viewed as forming a mask by which the input representation is filtered, where the mask comprises shapes that are labeled according to the type of object to which the shape corresponds. LIDAR or radar data (e.g., a 3D point cloud) can also be segmented, for example, by generating a 3D surface (e.g. a geometric mesh) representing the boundaries of an object. Segmentation can be performed algorithmically (e.g., using a software algorithm that performs geometric calculations to generate a surface of polygons as a geometric mesh) or using a machine learning (ML) model trained to infer the boundaries of an object from sensor data.

The object detection performed by the surface identification subsystem 320 does not necessarily involve identifying every object represented in the sensor data. Instead, the surface identification subsystem 320 can be configured to detect only certain objects of interest, including objects that are relevant to determining whether a surface is drivable or not. For example surface identification subsystem 320 can be configured to detect objects that render an otherwise drivable surface unsuitable for driving on (e.g., buildings, other vehicles, cone markers, poles, pools of liquid, cracks, and the like). An object does not have to pose a hazard in order to indicate that a surface is unsafe for driving. For example, the presence of a pile of soil or debris along an edge of a road and extending from a hillside could indicate that there is a risk of landslides, thereby making the road unsuitable for driving on even though the pile may not be an obstacle to a vehicle traveling along the road. Similarly, deformations or anomalies indicating that a surface is safe for driving can manifest in various, often subtle, ways. For example, a drivable surface could be indicated by the absence or trampling of grass or other plants in certain areas, where the absence or trampling is a result of earlier vehicle travel through those areas. Still other indicators may be specific to the manner in which a particular work site is configured. For instance, in mining sites, berms are typically shortened near road intersections so that the locations of intersections can be identified through detecting berms and where the berms end. Intended as a safety measure, berms are often required by government organizations to be at least half as tall as the wheels of the largest mining machine on-site.

Surface identification subsystem 320 can also be configured to detect objects whose presence confirms that a surface is in fact drivable. For example, surface identification subsystem 320 may detect tire tracks or other impressions, made by the autonomous vehicle or another vehicle. Based on the tire tracks, the surface identification subsystem 320 may estimate the direction in which a path previously traveled by the autonomous vehicle or other vehicle extends and may infer that the path is on a drivable surface.

In certain embodiments, detection of objects of interest and identification of drivable surfaces can be performed using one or more AI or ML models. For example, detection of objects can be performed by a CNN that has been trained to detect objects which represent driving hazards. In some embodiments, the surface identification subsystem 320 detects different attributes of the environment surrounding an autonomous vehicle using multiple types of sensor data. For example, as described below, a surface identification subsystem can include an AI or ML model that identifies the boundaries of known objects from one or more 2D camera images, another AI or ML model that estimates the depth of each pixel in the one or more 2D camera images, and yet another AI or ML model that estimates the location and orientation of a ground plane from a LIDAR point cloud. The surface identification subsystem 320 may further include a subsystem (e.g., a CNN or rule-based estimation subsystem) that combines the information generated by the various AI or ML models to generate a 3D representation of the environment, including representations of drivable surfaces and objects in the environment.

The output representation generated by the surface identification subsystem 320 can be provided as input to a planning subsystem, such as the planning subsystem 206 in FIG. 2A, to generate a plan of action taking into consideration information about a drivable surface indicated in the output representation. For instance, the plan of action may involve applying a set of rules to assess the safety and practicality of multiple paths that extend through the drivable surface between a first location and a second location. Based on the set of rules, the planning subsystem may select an optimal path, decide not to proceed with moving to the second location, or determine other appropriate actions for the autonomous vehicle. For example, the planning subsystem may select a longer path that has fewer driving hazards (e.g., cracks or pools of liquid above a certain size) over a shorter path that has more driving hazards or is more difficult to navigate (e.g., a path involving an incline above a certain angle or a curve whose radius is less than a minimum turning radius of the autonomous vehicle).

Figure 4:
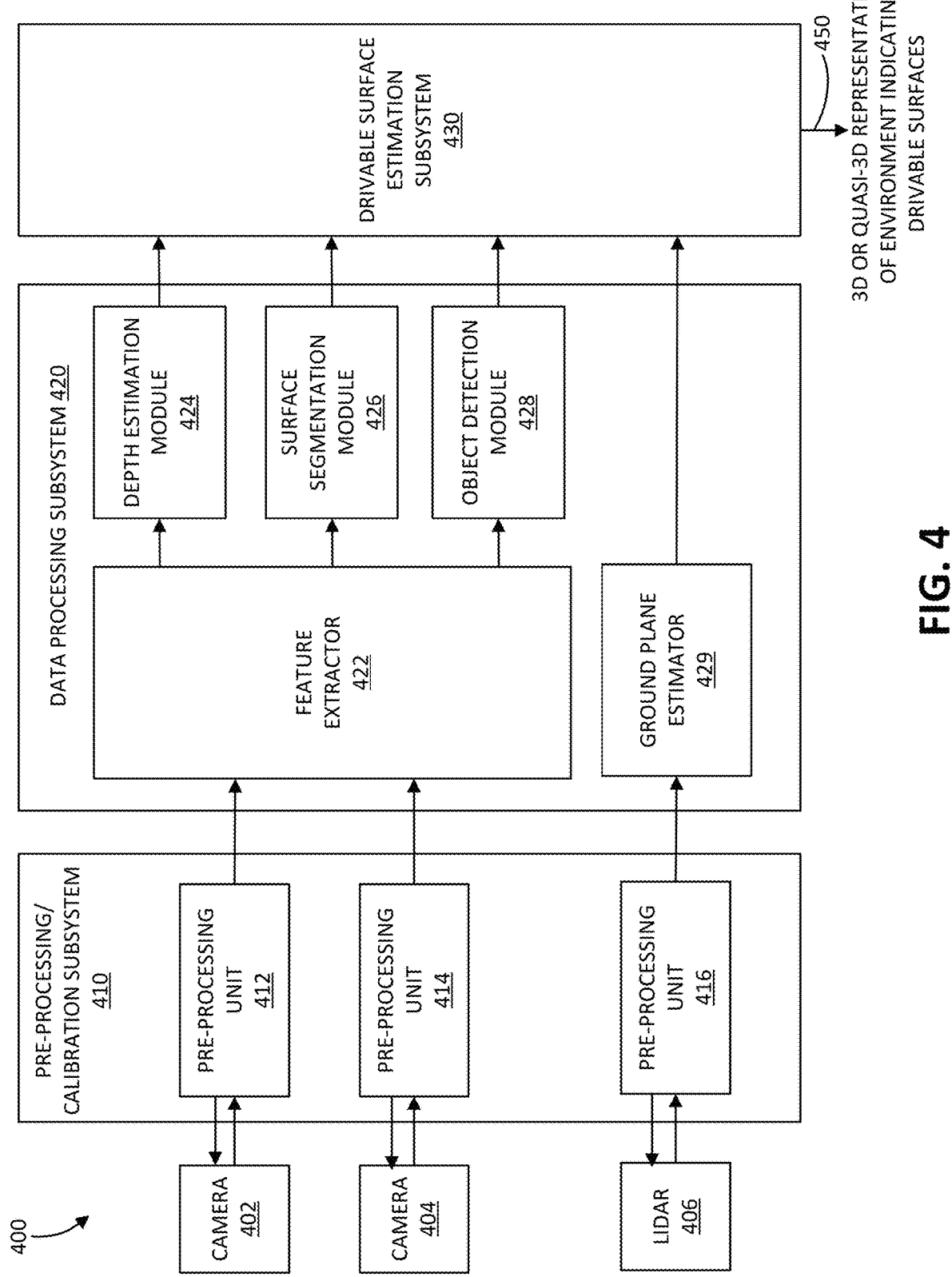
FIG. 4 is a simplified block diagram of various components in a perception subsystem according to certain embodiments.

FIG. 4 is a simplified block diagram of various components in a perception subsystem 400. The perception subsystem 400 can be used to implement the perception subsystem 300 in FIG. 3 and includes a pre-processing subsystem 410, a data processing subsystem 420, and a drivable surface estimation subsystem (DSES) 430.

Pre-processing subsystem 410 may correspond to the pre-processing subsystem 310 in FIG. 3 and receives sensor data from a plurality of sensors (e.g., a camera 402, a camera 404, and a LIDAR sensor 406). The number of sensors can vary. For instance, in some embodiments, there may only be one camera (e.g., a single camera and a single LIDAR sensor). Alternatively, as depicted in FIG. 4, there can be multiple cameras (e.g., two front-facing cameras and two rear-facing cameras) and at least one LIDAR sensor. Further, in some embodiments the LIDAR sensor 406 may be replaced with a radar sensor, or a radar sensor added to supplement the data generated by the LIDAR sensor 406 (e.g., supplementing a LIDAR point cloud with a radar-generated point cloud).

Each of the sensors in FIG. 4 is communicatively coupled to a respective pre-processing unit in the pre-processing subsystem 410. For example, camera 402 may be configured to provide image data to a pre-processing unit 412, camera 404 may be configured to provide image data to a pre-processing unit 414, and LIDAR sensor 406 may be configured to provide LIDAR data to a pre-processing unit 416. As described earlier in connection with the embodiment of FIG. 3, pre-processing may involve various post-capture and/or pre-capture operations for conditioning or formatting data from different sensors, as well as for calibrating the sensors. For the sake of brevity, the description of pre-processing is not repeated in the discussion of FIG. 4.

The sensor data used for generating any particular set of extracted features can be obtained using one or more temporal views and/or one or more spatial views. For instance, as indicated above, there can be multiple pairs of cameras or LIDAR sensors in different positions. A set of extracted features from which an output representation of a physical environment is generated can be the result of processing sensor data obtained over a period of time, e.g., sensor data collected over several image frames or over a course of vehicle movement.

Data processing subsystem 420 and DSES 430 together form a surface identification subsystem (e.g., the surface identification subsystem 320 in FIG. 3) that generates an output representation 450 of a physical environment. The output representation 450 can be a "true" 3D representation or quasi-3D representation indicating whether there are any drivable surfaces present in the environment. As depicted in FIG. 4, the data processing subsystem 420 can include various modules (424, 426, and 428) that receive input from a feature extractor 422. Additionally, the data processing subsystem 420 can include a ground plane estimator 429. The outputs of the modules 424, 426, and 428 and the ground plane estimator are processed by the DSES 430 to generate the output representation 450. In certain embodiments, the data processing subsystem 420 is implemented using one or more neural networks. For example, the data processing subsystem 420 can be a CNN-based module in which at least one of the components is embodied as a neural network configured to generate output data based on convolution operations.

Feature extractor 422 operates as a backbone network for the extraction of image features. In particular, the feature extractor 422 is configured to extract values for a set of features represented in the data from the cameras 402, 404. The feature extractor 422 can be implemented as a neural network that has been trained (e.g., through supervised learning and backpropagation) to generate a vector or multi-dimensional tensor for input to each of the modules 424, 426, and 428. The vector or multi-dimensional tensor is an abstract representation of a 2D image that combines information from the individual camera images. The feature extractor 422 typically includes many layers (e.g., on the order of a hundred) that perform various mathematical operations, including convolution and pooling operations. The feature extractor 422 can be trained using training images from a conventional training data set (e.g., the Cityscapes Dataset) and, in some embodiments, is implemented according to the ResNet-101 or ResNet-51 neural network architectures.

In certain embodiments, image data is supplied to the modules 424, 426, and 428 without first subjecting the image data to processing by a feature extractor. However, the inclusion of the feature extractor 422 in the embodiment of FIG. 4 increases computational efficiency by reducing the dimensionality of the input image space (e.g., an N-dimensional space corresponding to N number of pixels in a given image captured by camera 402 or camera 404).

Depth estimation module 424 is configured to generate a depth image, e.g., an RGB-D (red, green, blue, and depth) image, based on the features extracted by the feature extractor 422. Each pixel in the depth image is assigned a depth value indicating the depth at the location represented by the pixel. If the camera data, as represented in the features extracted by the feature extractor 422, captures a drivable surface, then the depth values for the drivable surface (e.g., the depth at various points along the drivable surface) will have been determined by virtue of estimating the depth for each pixel in the depth image. The depth values are assigned by the depth estimation module 424 based on one or more depth estimation techniques. For example, in a single camera implementation, the depth of a point on an object in the environment can be estimated based on changes in the appearance of the object between images captured at different locations, and further based on knowledge of how far the autonomous vehicle has traveled between the different locations. Similarly, in a multi-camera implementation, knowledge of differences in camera perspectives can be used to estimate the depth of a point on an object simultaneously observed through different cameras.

In some embodiments, the depth estimation module 424 is implemented using a CNN that has been trained to infer depth values for each pixel of the depth image without having to explicitly perform geometric calculations. Training of the depth estimation module 424 may involve providing the depth estimation module 424 with training images depicting surfaces and/or objects, at different distances away from the camera that captured the training image. The depth images generated as a result of processing the training images can then be compared to corresponding ground truth depth information (e.g., the correct depth value for each pixel in a training image) to adjust the CNN by changing weights and/or bias values for one or more layers of the CNN such that a loss function is minimized.

Surface segmentation module 426 is configured to generate, using the extracted features, a segmented image that is divided into different surfaces. The segmented image is a 2D image indicating which areas correspond to potentially drivable surfaces (e.g., road surfaces) and which areas correspond to non-drivable surfaces (e.g., grass, hills, or other terrain). For example, the segmented image can be an RGB formatted 2D image in which each pixel has been assigned a class of "road" or a class of "non-road". Thus, the segmented image can represent the result of performing classification on the extracted features, possibly classification that divides regions in the segmented image into one of two types of surfaces: potentially drivable and non-drivable. In some embodiments, the surface segmentation module 426 is configured to detect additional surface classes, e.g., different types of roads or different non-road surfaces. The surface segmentation module 426 can be implemented as a CNN trained to determine whether a particular set of feature values corresponds to a drivable surface. For instance, the surface segmentation module 426 can be trained with positive examples (e.g., feature values representing road surfaces) and/or negative examples (e.g., feature values representing non-road surfaces). In some embodiments, the CNN implementing the surface segmentation module 426 may employ conditional random fields (CRFs) to estimate the probability of a particular set of feature values corresponding to a drivable surface. CRFs provide a probabilistic framework for labeling and segmenting structured data and are often used for image segmentation.

Object detection module 428 is configured to detect known objects. In particular, the object detection module 428 can detect non-surface objects that belong to one or more predefined classes (e.g., objects that do not correspond to road, terrain, sky, or other surfaces on the ground or in the air). The object detection module 428 may generate a segmented image divided into different objects. Examples of objects that can be detected using the object detection module 428 include other vehicles, poles, traffic signs, buildings, and the ego vehicle itself. For instance, in some embodiments, object detection module 428 may recognize that certain parts of the ego vehicle have been captured in an image generated by camera 402 or camera 404 (e.g., because a bucket arm or side of the ego vehicle is within the field of view of one or more of the cameras 402, 404). Like the depth estimation module 424 and the surface segmentation module 426, the object detection module 428 can be implemented as a neural network such as a CNN. As such, the object detection module 428 may be trained on features extracted from images representing different classes of objects.

Ground plane estimator 429 is configured to determine, based on LIDAR data supplied by the pre-processing unit 416, which portions of the LIDAR data correspond to a ground surface. More specifically, the ground plane estimator 429 is configured to estimate a 2D plane representing the ground of the physical environment. Estimating the ground plane allows surfaces and objects to be defined in relation to the ground plane. The ground plane can intersect or at last partially overlap certain surfaces, including drivable surfaces and/or non-drivable surfaces. For example, a road may generally follow (be coplanar with) the ground plane, while a hill may extend above a particular area along the ground plane. In certain embodiments, the LIDAR data can be input to the ground plane estimator 429 as a point cloud. Because point clouds are three-dimensional, they generally provide more accurate depth information compared to depth values estimated from 2D images (e.g., the results of the processing performed by the depth estimation module 424). Enhanced depth accuracy is beneficial when estimating the orientation of a ground plane. In contrast, detection of objects and different types of surfaces benefits more from camera images than LIDAR data since different types or surfaces can usually be distinguished based on color, brightness, or shading.

In certain embodiments, the ground plane estimator 429 estimates a ground plane by performing principal component analysis (PCA) on a LIDAR point cloud. Ground plane estimator 429 may output an augmented point cloud in which a 2D plane representing the ground is drawn through a subset of points. The PCA analysis can be performed in a piecewise manner by fitting piecewise functions (e.g., polynomials representing different spline shapes) through points in the LIDAR point cloud to form surfaces. The fitting process can produce multiple surfaces, not all of which correspond to the ground surface. For instance, if vertical surfaces are formed as a result of the fitting process, it can be inferred that such surfaces, by virtue of their vertical orientation, and assuming that the LIDAR sensor is not tilted 90 degrees, are part of a wall or other vertical structure instead of the ground. However, if most or all surfaces in a local region are below a certain grade (e.g., between −5 and +5 degrees), it may be inferred that such surfaces are part of the ground.

Although the ground plane estimator 429 can estimate the ground plane, the ground plane does not in itself indicate which surfaces are drivable. To identify drivable surfaces, the results generated by each of the modules 424, 426, and 428 and the ground plane estimate are supplied to the DSES 430 for further processing. Accordingly, the modules 424, 426, and 428 and the ground plane estimator 429 can operate in parallel with each other to produce inputs to the DSES 430.

DSES 430 is configured to generate the output representation 450 of the environment based on the results of the processing performed by the various components of the data processing subsystem 420. DSES 430 can be implemented as a neural network. Alternatively, in certain embodiments, DSES 430 is implemented as a software algorithm that applies a set of rules for determining, for any surface that has been detected as being a potentially drivable surface (e.g., a road under consideration for inclusion in a path from a first location to a second location), a probability value representing the likelihood that the surface is drivable. DSES 430 may be configured with rules that specify conditions which, if satisfied, either increase or decrease the probability value. For instance, conditions may relate to width of surface, degree of incline, whether the surface is muddy or non-uniform (e.g., bumpy), whether the surface includes certain types of deformations such as cracks or tire tracks, and/or other relevant attributes of a surface as indicated by the outputs of the data processing subsystem 420. In general, a drivable surface may be associated with a pre-defined set of characteristics/attributes and feature parameters. The output representation 450 may reflect the results of applying the set of rules. For instance, the output representation 450 may indicate one or more areas as being drivable surfaces by virtue of the probability value for the one or more areas exceeding a threshold value.

The DSES 430 may receive real time information regarding various feature parameters from the depth estimation module 424, the surface segmentation module 426, and the object detection module 428. For example, the depth estimation module 424 may provide information on the slope of a road surface. A change of slope that exceeds certain threshold might indicate end of road segment and start of a berm (e.g., a pile of dirt and/or rock alongside a haulage road or along the edge of a dump point). As another example, the surface segmentation module may provide information indicating the edge of the road, which information can be used in combination with information from the depth estimation module 424 and the object detection module 428 to determine whether the road is drivable. Further, the object detection module 428 may provide information indicating whether there are objects on the road that obstruct the travel along the road. The DSES 430 may combine all of the above-listed outputs of the data processing subsystem 420, e.g., algorithmically or using a neural network, to determine the boundaries of the road surface and which areas of the road surface are drivable.

In some embodiments, the determination of whether a surface is drivable can be delegated to another component of an AVMS, in which case the output representation 450 may simply indicate potentially drivable surfaces and objects in the environment, without definitively classifying any particular surface as being drivable. For example, as mentioned above, the planning subsystem 206 in FIG. 2A can determine a plan of action based on information identifying safety considerations, such as not making a turn with less than a minimum turning radius, not climbing over a grade more than a certain number of degrees, not driving over a pool of liquid above a certain size, etc. Accordingly, in certain embodiments, the output representation 450 indicates boundaries of surfaces that are potentially drivable and is subjected to further processing (e.g., by the planning subsystem 206) to determine which surfaces in the output representation 450 are drivable.

The output representation 450 generated by the DSES 430 can be a 3D or quasi-3D representation that incorporates different types of information from the outputs of the various modules in the data processing subsystem 420. For instance, the output representation 450 can be a voxel grid in which the boundaries of objects and surfaces are marked, and where the boundaries are estimated based on the outputs of the depth estimation module 424, the surface segmentation module 426 and the object detection module 428. The output representation 450 can also indicate the height of each voxel in the voxel grid, and therefore changes in elevation along surfaces. The height of each voxel can be specified relative to the ground plane produced by the ground plane estimator 429.

In some embodiments, the DSES 430 may generate the output representation 450 using the output of the ground plane estimator 429 as a starting point. As mentioned earlier, LIDAR sensors (and similarly, radar sensors) generally provide more accurate depth information compared to cameras. Further, the data generated by LIDAR and radar sensors is inherently three-dimensional, so depth does not need to be estimated through additional processing of the LIDAR/radar data. Thus, the output of the ground plane estimator 429 may provide the DSES 430 with a rough approximation of the 3D contours of the physical environment, including the approximate shape and boundaries of objects and surfaces. Combining the output of the ground plane estimator 429 with the output of the depth estimation module 424, the surface segmentation module 426, and the object detection module 428 improves the accuracy with which the boundaries of objects and surfaces are identified in 3D space. For instance, the contours of a particular object or the boundary between an object and a surface can be more precisely estimated based on color information included in the outputs of the modules 424, 426, and 428.

To combine the outputs of the data processing subsystem 420, the DSES 430 may perform geometric transformations or calculations that map data from different sensors onto each other. For instance, the DSES 430 may generate the output representation 450 taking into account differences between the orientation and positions of the LIDAR sensor 460 and the cameras 402, 404. In some embodiments, the DSES 430 may project a LIDAR point cloud onto a top-down Bird's Eye View (BEV) and then fuse the projected LIDAR data with the outputs of the modules 424, 426, and 428 to produce the output representation 450, e.g., in the form of a Digital Elevation Map (DEM). This is an example of LIDAR-centric fusion. Alternatively, in other embodiments, the DSES 430 may project a LIDAR point cloud onto a camera field of view (camera-centric fusion), e.g., using cylindrical transforms to transform the LIDAR data to a camera coordinate system. Points can be projected back onto the LIDAR sensor's frame of reference (e.g., a global coordinate system) to confirm the locations of drivable or potentially drivable surfaces.

In a "true" 3D representation such as a voxel grid, each two-dimensional coordinate can have associated with it multiple values for the third dimension (e.g., the height dimension). For example, a tunnel may extend through two or more voxels that share the same x, y coordinate, but different z coordinates (e.g., a first z-value corresponding to the tunnel's floor and a second z-value corresponding to the tunnel's ceiling). A quasi-3D representation also has height information, but is limited to providing a single height value for any given two-dimensional coordinate. DEMs are one example of a quasi-3D representation. A DEM is essentially a 2D grid in which each grid location (e.g., a square tile representing a 10 centimeter by 10 centimeter area in the physical environment) has a single height value assigned to it. RGB-D images are another example of a quasi-3D representation in which, for any given pixel at image coordinates (x, y), only one depth value is assigned to the pixel. Irrespective of whether the output representation 450 is 3D or quasi-3D, each elementary unit (e.g., an individual voxel or grid tile) in the output representation 450 can be assigned a label indicating whether the corresponding location in the physical environment is drivable or potentially drivable. As used herein, the term "3D representation" can refer to either a "true" 3D representation or a quasi-3D representation.

Figure 5:
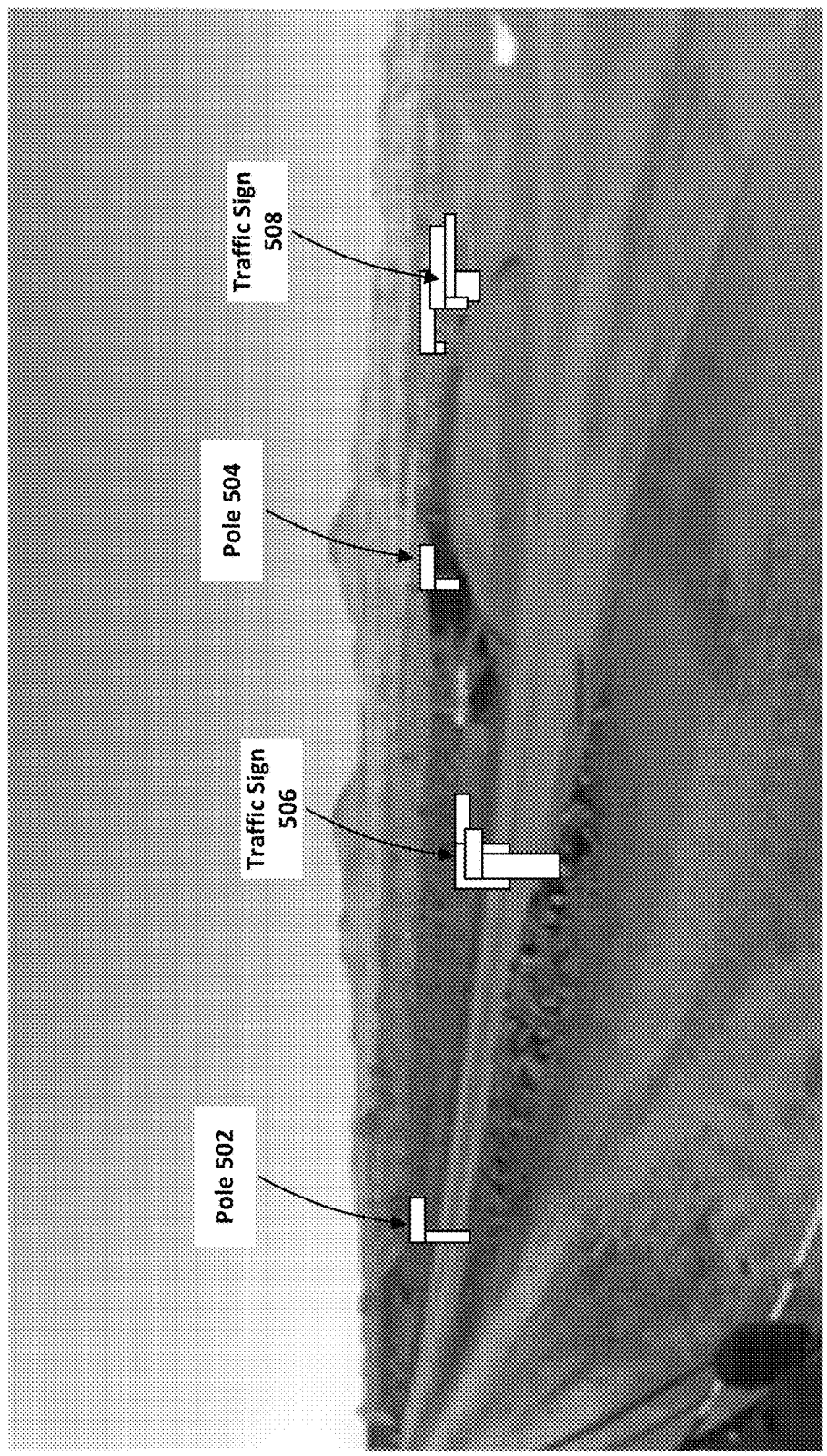
FIG. 5 illustrates an example of the results of object detection performed on a camera image according to certain embodiments.

FIG. 5 illustrates an example of the results of object detection performed on a camera image according to certain embodiments. FIG. 5 shows an image 500 corresponding to a photo of a work site where there are unpaved dirt roads and piles of material located throughout the work site. In some instances, such piles may indicate drivable surfaces. For example, in a mining site, a berm formed of compacted material can operate as a safety barrier or may be placed along a path to mark the edge of the path as well as the general direction of the path.

The image 500 may correspond to an augmented image generated by the object detection module 428 in FIG. 4. As shown in FIG. 5, the image 500 comprises a set of boxes superimposed onto the photo of the work site. The set of boxes include, for each detected object, a box representing the boundary of the object. For instance, boxes are shown around the border of a pole 502, a pole 504, a traffic sign 506, and a traffic sign 508. The set of boxes can further include boxes corresponding to text labels or other graphical indicators of object class. For instance, each object boundary can be annotated with box located next to the object boundary, where the annotation is labeled with description text (e.g., "pole") or a color distinguishing the object from objects of other classes. In the embodiment of FIG. 5, these annotations are depicted as boxes extending in the horizontal direction.

Figure 6:
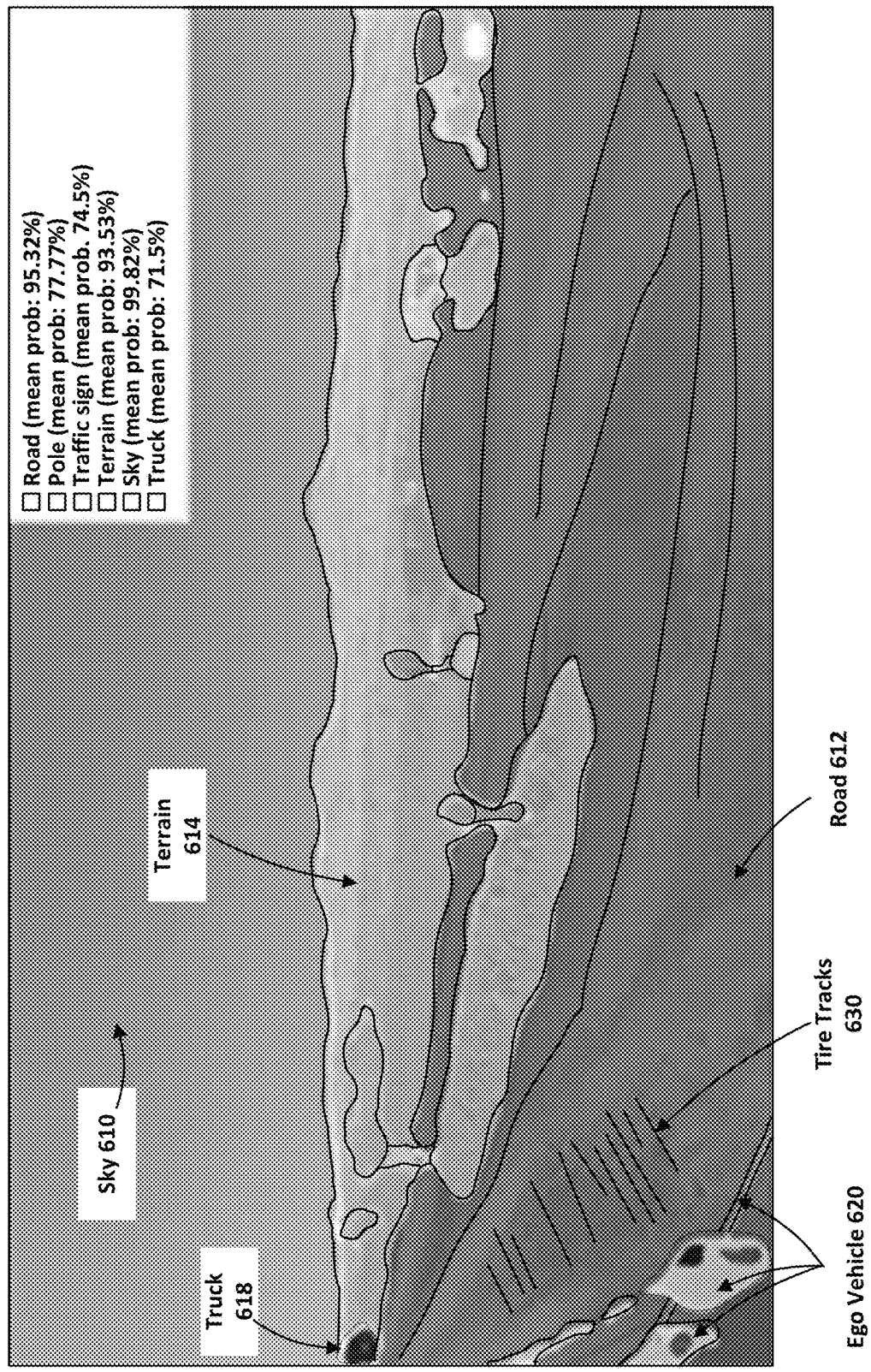
FIG. 6 illustrates an example of an output representation generated by combining camera data with LIDAR data according to certain embodiments.

FIG. 6 illustrates an example of an output representation generated by combining camera data with LIDAR data according to certain embodiments. FIG. 6 shows a representation 600 that could potentially be generated using the image 500 in FIG. 5. The representation 600, as depicted in FIG. 6, is a visualization of a 3D representation potentially produced by a surface identification subsystem (e.g., an image displayed to a human operator of the ego vehicle). The representation 600 can be stored or communicated between components of an AVMS in any number of computer-readable formats. In some embodiments, the representation 600 may not be displayed at all.

The representation 600 may correspond to the output representation 450 generated by the DSES 430 in FIG. 4. The representation 600 generally corresponds to the image 500, but has been segmented into different regions, including regions corresponding to a sky 610, a road 612, and terrain 614 (e.g., hills in the background). The representation 600 also includes boundaries for the detected objects shown in the image 500. The processing that generates the representation 600 can detect additional objects not detected based solely on the photo from which the image 500 was generated. For example, as shown in FIG. 6, the representation 600 includes a boundary for a truck 618 located farther up the road 612 and boundaries for several regions along the side of an ego vehicle 620. The detection of the additional objects is made possible because additional sources of information (e.g., an image from another camera and/or LIDAR data) may be used to generate the representation 600.

The representation 600 is a 3D representation. In particular, the representation 600 is characterized by shading. Such shading can indicate the contours and direction of surfaces or objects in the physical environment, including the curvature and direction of the road 612. In some embodiments, the representation 600 may represent the environment in a more simplified form compared to the photo from which the image 500 was generated. For example, each surface type or object type can be represented by one particular color and shades of that particular color (e.g., brown for roads, green for terrain, blue for sky, yellow for objects, etc.). As shown in FIG. 6, the representation 600 includes probability values determined for the various surfaces and objects mentioned above. The representation 600 also includes a set of tire tracks 630 which indicate the direction of the road 612.

Figure 7:
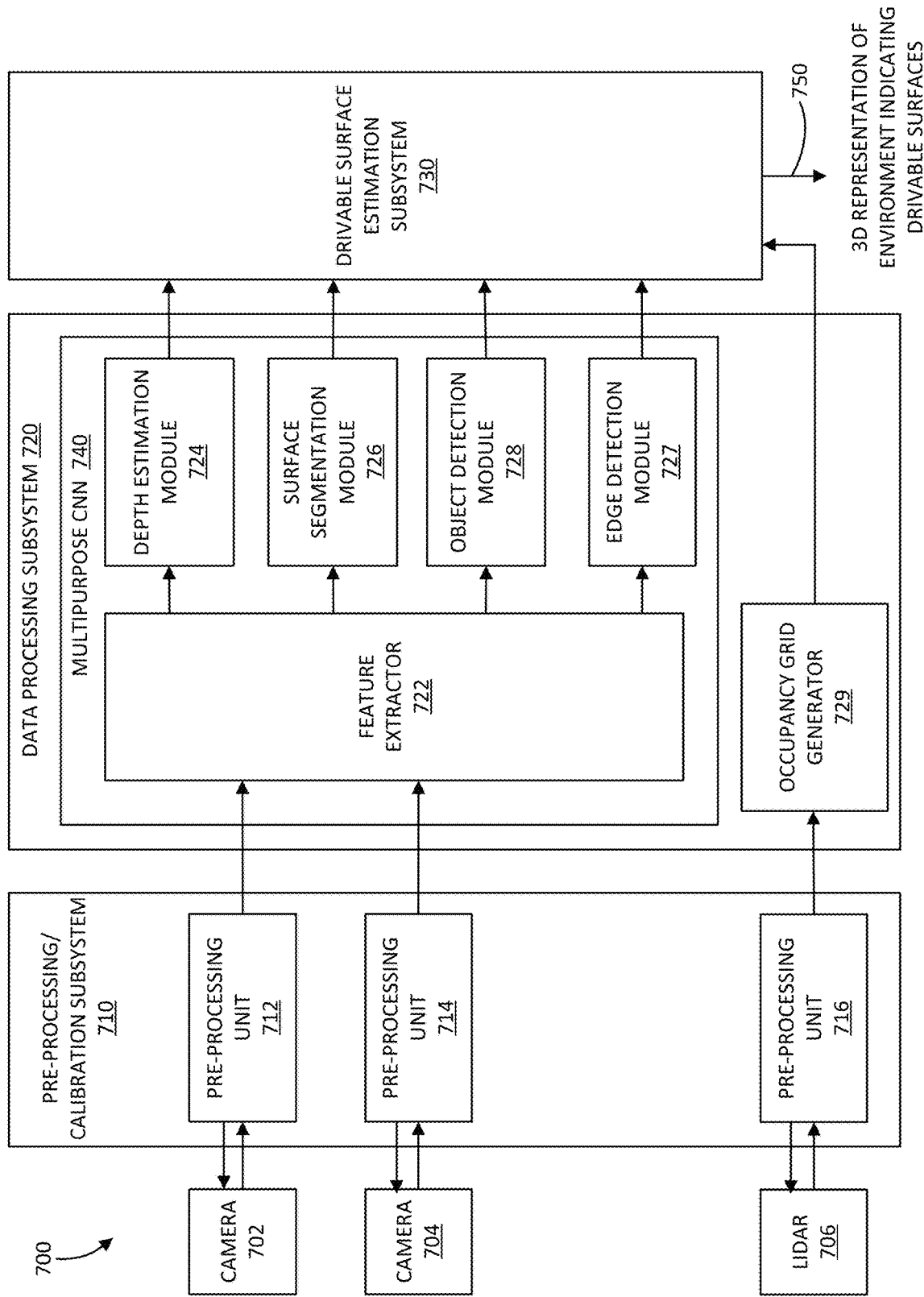
FIG. 7 is a simplified block diagram of various components in a perception subsystem according to certain embodiments.

FIG. 7 is a simplified block diagram of various components in a perception subsystem 700. The perception subsystem 700 can be used to implement the perception subsystem 300 in FIG. 3. Similar to the embodiment depicted in FIG. 4, the perception subsystem 700 includes a pre-processing subsystem 710 comprising pre-processing units 712, 714, and 716, each pre-processing unit configured to receive images captured by a corresponding sensor (e.g., a camera 702, a camera 704, or a LIDAR sensor 706). The perception subsystem 700 further includes a DSES 730.

The perception subsystem 700 further includes a data processing subsystem 720. The data processing subsystem 720 includes a feature extractor 722 analogous to the feature extractor 422. The data processing subsystem 720 further includes a depth estimation module 724, a surface segmentation module 726, an object detection module 728, an edge detection module 727, and an occupancy grid generator 729. The depth estimation module 724, surface segmentation module 726, and object detection module 728 are analogous to the depth estimation module 424, surface segmentation module 426, and object detection module 428, respectively. The functionality provided by these components is essentially the same as that discussed above with respect to the counterpart components in FIG. 4.

As depicted in FIG. 7, the feature extractor 722, the depth estimation module 724, the surface segmentation module 726, the object detection module 728, and the edge detection module 727 can be components of a multipurpose CNN 740. Multipurpose CNN 740 may include a separate sub-network for each of its components, where each subnetwork includes at least one convolutional layer. For instance, the feature extractor 722 may correspond to a first set of layers, the depth estimation module 724 to a second set of layers coupled to an output of the first set of layers, and so on.

Edge detection module 727 is configured to identify edges and boundaries. Identification of edges is important because large sharp objects (which are usually characterized by thin edges) can cause damage to vehicles (e.g., tire puncture). Edges are also often associated with boundaries of roads or other drivable surfaces. The edge detection module 727 generates a 2D representation that is an abstract or cartoon-like image which combines information from the images captured by the cameras 702 and 704. The 2D representation generated by the edge detection module 727 indicates, using a combination of line segments and other geometric shapes (e.g., splines), locations of detected edges. The edge detection module 727 can detect the edges and boundaries without identifying objects. For instance, the edge detection module 727 can recognize the outline of a surface or object, but may not necessarily associate the outline with any particular surface or object. The edge detection module 727 may, in some instances, detect edges or boundaries that the surface segmentation module 726 fails to detect, e.g., edges of an object located on a potentially drivable surface. For instance, the surface segmentation module 726 may not detect edges well when the edges are similar in color to their surroundings. One example of such a scenario is when there are tire tracks of the same color as the surrounding road. Surface segmentation module 726 may be configured to perform such detection using an AI or ML model trained to detect roads or other drivable surfaces using raw image input without the aid of predefined features. In contrast, the edge detection module 727 may be configured to perform detection using an AI or ML model trained to learn and detect a set of predefined features that are indicative of the presence of edges.

Occupancy grid generator 729 provides an alternative to the ground plane estimator 429 in the embodiment of FIG. 4. The occupancy grid generator 729 is configured to generate an occupancy grid as a 3D grid (e.g., a voxel grid) in which a value or label is assigned to each grid location (e.g., individual voxel) to indicate whether or not the grid location is physically occupied. A location is deemed occupied if sensor data indicates that the location does not correspond to empty space (e.g., air). For instance, a location in a physical environment can be occupied by an object (e.g., a pole) or by a large surface (e.g., the ground, a road). Occupied locations that are near each other often belong to the same object. As shown in FIG. 4, the occupancy grid generator 729 operates on LIDAR data. The occupancy grid generator 729 could also work with radar data. The occupancy grid generator 729 can be implemented using one or more computer vision algorithms and/or a Gaussian Mixture Model (GMM) that assigns grid locations to one of two classes: "occupied" and "non-occupied" based on analysis of the points in a LIDAR point cloud. For instance, the distribution of the points and the nearest neighbors to a given point may indicate whether a particular location of the occupancy grid is occupied. In some embodiments, the occupancy grid generator 729 uses a GMM to form the occupancy grid as a k-dimensional (k-d) tree in three dimensions. A k-d tree is a binary tree that can be used to partition a data space into two or more mutually exclusive subsets.

In certain embodiments, the occupancy grid generator 729 is substituted with a voxel CNN. The voxel CNN can include one or more fully convolutional layers and can be trained, using example point clouds and ground truth voxel grids, to infer the occupied status of each location in the occupancy grid and to output a voxel grid according to the occupied statuses.

DSES 730 operates similarly to the DSES 430 in FIG. 4 and is configured to generate a 3D or quasi-3D representation 750 that indicates one or more drivable surfaces. As with the embodiment in FIG. 4, the outputs produced by the various components in the data processing subsystem are provided as input to the DSES. In the embodiment of FIG. 4, the output of the ground plane estimator 429 may not in itself provide information sufficient for identifying a drivable surface. Instead, as indicated above, the output of the ground plane estimator 429 may be combined with outputs of other modules of the data processing subsystem 420 to identify a drivable surface. Likewise, the DSES 730 may combine the output of the edge detection module 727 with outputs of other components of the data processing subsystem 720 to identify a drivable surface. For example, the DSES 730 may identify a drivable surface, within a deterministic error band, based on combining the output of the edge detection module 727 with the output of the occupancy grid generator 729. The outputs of the depth estimation module 724, the surface segmentation module 726, and the object detection module 728 may be used to reduce the range of error.

The data processing subsystem 720 and the multipurpose CNN 740 can be trained in different ways. In some embodiments, the feature extractor 722 is trained prior to training of the modules 724, 726, 728, and 727, and also prior to training of the DSES 730. For instance, feature extractor 722 can be a neural network that has already been trained using a conventional dataset of images. The pre-trained feature extractor 722 is used to extract features from training images. The modules 724, 726, 728, and 727 can then be trained separately, with the configuration of the feature extractor 722 being fixed according to a result of the earlier training. Training of the modules 724, 726, 728, and 727 may involve inputting the extracted features produced by the pre-trained feature extractor to generate multiple 2D representations (e.g., an RGB-D image, a segmented image, an image with bounding boxes around detected objects, or an image with line segments corresponding to detected edges). The 2D representation generated by a particular module 724, 726, 728, or 727 can be compared to a ground truth representation (e.g., a correct RGB-D image or a correctly segmented image), and the weights and/or biases used by the particular module can be adjusted according to the results of the comparison. In this manner, the modules 724, 726, 728, and 727 can be trained one at a time. Once training of the modules 724, 726, 728, and 727 is complete (e.g., after each of these modules has reached a certain level of accuracy), training of the DSES 730 can begin.

Alternatively, in some embodiments, the entire multipurpose CNN 740 is trained as a single unit. In such embodiments, training images can be input to the feature extractor 722 one at a time to generate, for each training image, a set of extracted features that are then processed by the modules 724, 726, 728, and 727 to produce the various 2D representations. The 2D representations produced are then compared to ground truth 2D representations corresponding to correct outputs for each of the modules 724, 726, 728, and 727 to make adjustments to each component of the multipurpose CNN 740, using backpropagation so that the various weights and/or biases employed by the various components in the multipurpose CNN 740 are adjusted concurrently. Once fully trained, the multipurpose CNN 740 can then be used to generate input for training the DSES 730. The error in the output representation 750, as determined based on a comparison of the output representation 750 to a ground truth output representation, is then back-propagated to adjust weights and/or biases employed by the DSES 730. When the multipurpose CNN 740 is trained as a single unit, the feature extractor 722 can be adjusted using a relatively low adaptation rate, e.g., so that the weights and biases of the feature extractor 722 do not change as quickly as those used of the modules 724, 726, 728, and 727.

Figure 8:
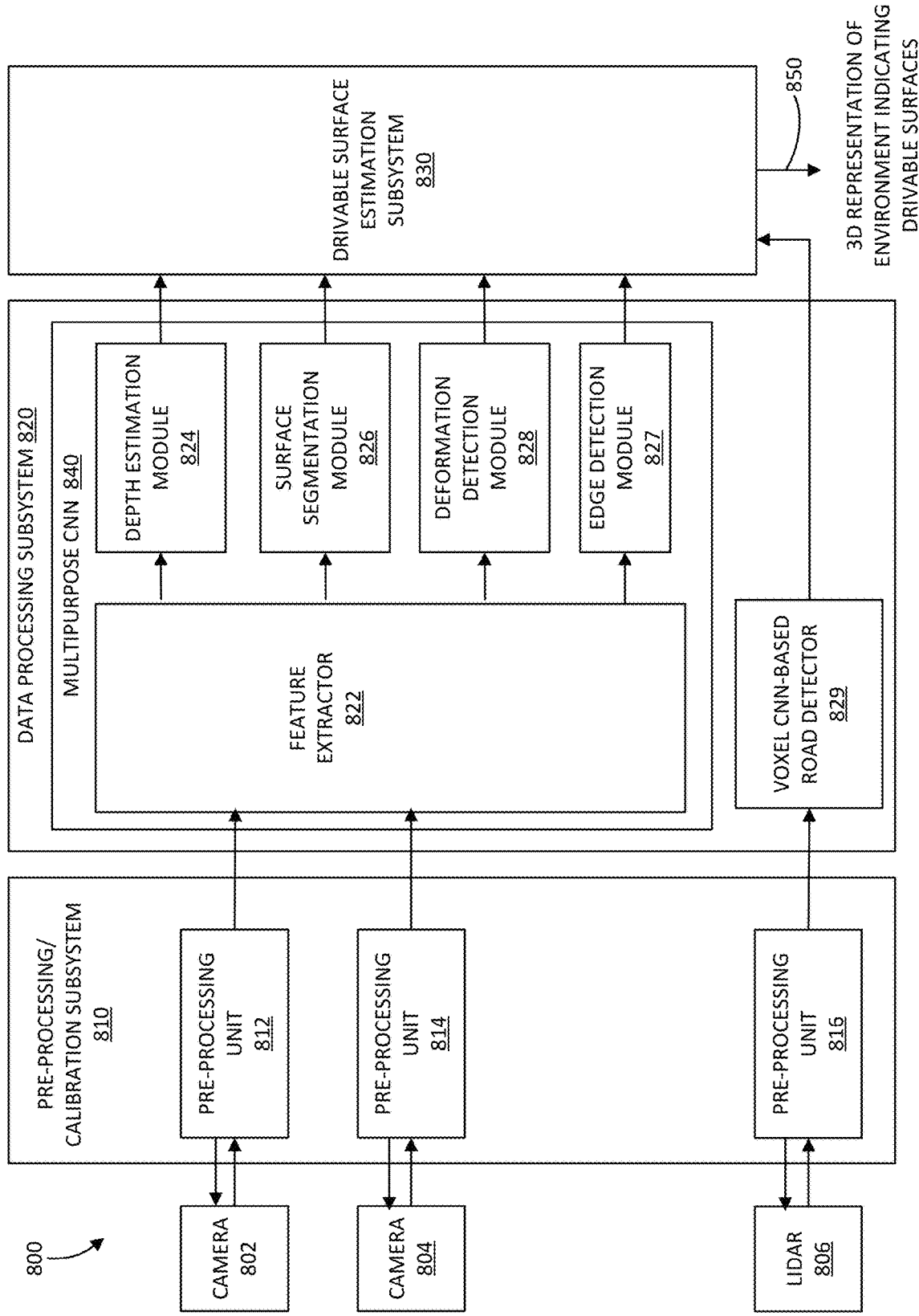
FIG. 8 is a simplified block diagram of various components in a perception subsystem according to certain embodiments.

FIG. 8 is a simplified block diagram of various components in a perception subsystem 800. The perception subsystem 800 can be used to implement the perception subsystem 300 in FIG. 3. The perception subsystem 800 is configured to generate a 3D or quasi-3D representation indicating at least the locations of surface deformations or anomalies in a physical environment. Additionally, it will be understood that perception subsystem 800 can incorporate components that enable the 3D or quasi-3D representation generated by the perception subsystem 800 to further indicate drivable or potentially drivable surfaces. Since such components have already been described in connection with the embodiments of FIGS. 4 and 7, they are omitted from FIG. 8. Further, the embodiments of FIGS. 4 and 7 can be combined with the embodiment of FIG. 8 in various ways. In some embodiments, generating a representation indicative of drivable surfaces and generating a representation indicative of surface deformations or anomalies are performed by separate perception subsystems, with the results being combined to generate a final 3D or quasi-3D representation. In other embodiments, various components depicted in FIGS. 4, 7, and 8 may be combined into a single perception subsystem.

Similar to the embodiments depicted in FIGS. 4 and 7, the perception subsystem 800 includes a pre-processing module 810 including pre-processing units 812, 814, and 816, each pre-processing unit configured to receive images captured by a corresponding sensor (e.g., a camera 802, a camera 804, or a LIDAR sensor 806). The perception subsystem 800 further includes a DSES 830.

The perception subsystem 800 further includes a data processing subsystem 820. The data processing subsystem 820 includes a feature extractor 822 analogous to the feature extractor 422. The data processing subsystem 820 further includes a depth estimation module 824, a surface segmentation module 826, a deformation detection module 828, an edge detection module 827, and a voxel CNN-based road detector 829. The depth estimation module 824 and the edge detection module 827 are analogous to depth estimation module 724 and edge detection module 727, respectively.

Surface segmentation module 826 operates in a manner similar to that of the surface segmentation module 426 in FIG. 4 or the surface segmentation module 726 in FIG. 7. In particular, the surface segmentation module 826 is configured to generate, using features extracted by the feature extractor 822, a segmented 2D image that is divided into different surfaces. However, the surface segmentation module 826 is specifically configured to estimate boundaries of surfaces associated with certain types of deformations or anomalies. For instance, the surface segmentation module 826 can be implemented as a CNN trained to determine whether a particular combination of feature values corresponds to the surface of a rock, pool of liquid, crack, or other driving hazard.

Deformation detection module 828 operates in a manner similar to that of the object detection module 428 in FIG. 4 or the object detection module 728 in FIG. 7. However, the deformation detection module 828 is specifically configured to detect objects that correspond to surface deformations or anomalies. For example, the deformation detection module 828 can be implemented using a CNN trained on features extracted from images representing different classes of surface deformations or anomalies (e.g., cracks of different size, shape or surrounding material). In some embodiments, the deformation detection module 828 is trained through transfer learning. Transfer learning is a branch of machine learning that involves applying knowledge learned in solving one problem to solve a different, but related problem. For example, the deformation detection module 828 could be trained, at least in part, on a dataset designed for edge or boundary detection, e.g., the same dataset as that which is used to train the edge detection module 827.

Road detector 829 can be implemented using a CNN configured to generate a voxel grid indicating the locations of voxels that correspond to road surfaces and/or other types of drivable surfaces. In this regard, the road detector 829 can operate in a manner similar to that of the above-described voxel CNN alternative to the occupancy grid generator 729 in FIG. 7. However, instead of classifying the voxels into classes of occupied versus non-occupied, the classification performed by the road detector 829 may divide the voxels into classes of, for example, "road" and "non-road."

DSES 830 operates similarly to the DSES 430 in FIG. 4 or the DSES 730 in FIG. 7, and is configured to generate a 3D or quasi-3D output representation 850 using the outputs produced by the various components in the data processing subsystem 820. The output representation 850 can indicate one or more drivable surfaces. For instance, the output representation 850 could be a colorized DEM or colorized voxel grid indicating certain voxels or tiles as corresponding to a road. Additionally or alternatively, the output representation 850 can indicate whether there are any surface deformations or anomalies in the environment. Of particular interest are surface deformations or anomalies located on drivable or potentially drivable surfaces. The output representation 850 may, for example, indicate certain voxels or tiles as corresponding to cracks or rocks that are located on or near a road.

As depicted in FIG. 8, the feature extractor 822, the depth estimation module 824, the surface segmentation module 826, the deformation detection module 828, and the edge detection module 827 can be components of a multipurpose CNN 840. The multipurpose CNN 840 can be trained in a similar manner to the multipurpose CNN 740 in FIG. 7. For instance, the feature extractor 822 can be pre-trained to produce extracted features used for individually training each of the modules 824, 826, 828, and 827, followed by training of the DSES 830 once training of the modules 824, 826, 828, and 827 is complete. Alternatively, as discussed earlier with respect to the multipurpose CNN 740, the entire multipurpose CNN 840 could be trained as a single unit.

As indicated above, the output representation generated by a surface identification subsystem can facilitate the performing of various tasks by an autonomous machine. For instance, the surface identification subsystem 320 may communicate an output representation, generated in accordance with one or more of the embodiments depicted in FIGS. 4, 7, and 8, to the planning subsystem 206 in FIG. 2 to enable the planning subsystem 206 to generate a plan of action which may involve, for example, navigating along a drivable surface indicated by the output representation.

Figure 9:
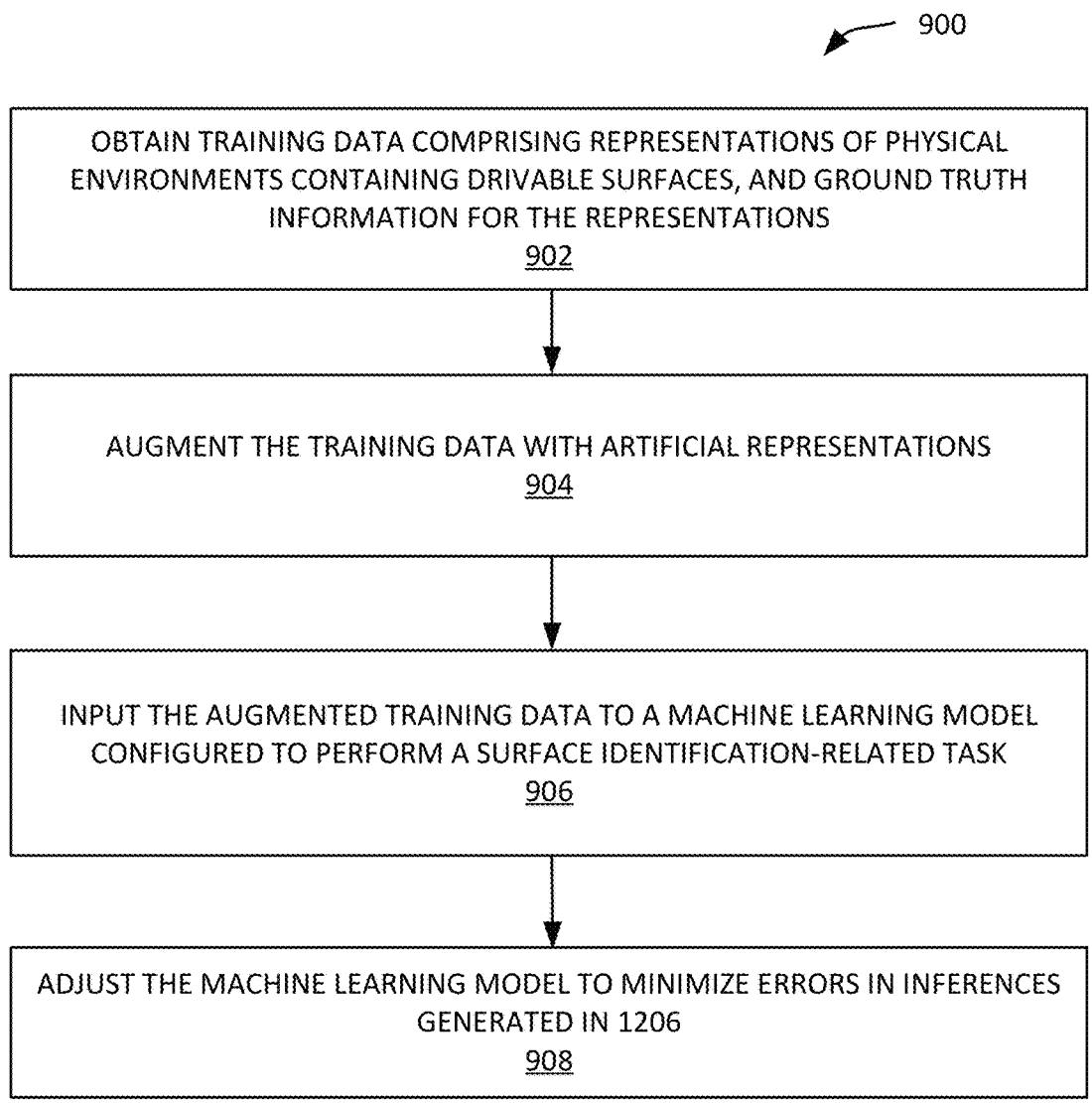
FIG. 9 is a flow chart illustrating a process for training a machine learning model to perform a surface identification-related task according to certain embodiments.

FIG. 9 is a flow chart illustrating a process 900 for training a machine learning model to perform a surface identification-related task according to certain embodiments. The process 900 can, for example, be used to train one or more neural networks within surface identification subsystem 320. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 4, the processing depicted in FIG. 9 may be performed, in part, by a machine learning model in a data processing subsystem of a perception subsystem (e.g., by a CNN implementing the feature extractor 422 or a CNN implementing one of the modules 424, 426, 428).

At 902, training data comprising representations of physical environments containing drivable surfaces are obtained. More specifically, the obtained training data may include 2D and/or 3D representations of the physical environments. For example, the training data may include a set of labeled training images and/or a set of label point clouds. Additionally, in some embodiments, the training data obtained in 902 includes at least some negative examples (e.g., images depicting non-drivable surfaces). Training on negative images or datasets helps reduce the occurrence of false positives (detection of a drivable surface when the surface is, in fact, not drivable). Examples of negative datasets include images of pedestrian walkways, farmland, barren land, and restricted use driveways.

The training data obtained in 902 may further include representations of different classes of objects, surface deformations, or anomalies that are relevant to determining whether a surface is drivable or not. For example, the training data can include images of rocks, cracks, bodies of water, poles, traffic signs, tire tracks, trampled grass, and the like.

Additionally, at 902, ground truth information for the representations is obtained. Ground truth information can include, for example, the correct depth values for each location in an image to be generated by the depth estimation module 424, correctly drawn borders around each segment in an image to be generated by the surface segmentation module 426, and/or correctly labeled object classes for an image to be generated by the object detection module 428.

At 904, the training data obtained at 902 is augmented with artificial representations. For example, the artificial representations may include computer-generated images of cracks generated by performing scaling or other types of transformations on photos of real-life cracks. The ground truth information obtained in 902 can likewise be augmented with ground truth information for the artificial representations.

At 906, the augmented training data (comprising the training data obtained at 902 plus the artificial representations in 904) is input to a machine learning model that is configured to perform a surface identification-related task (e.g., depth estimation, surface segmentation, object detection, or drivable surface estimation). The machine learned model may use the augmented training data to generate a set of inferences, e.g., a set of classifications.

At 908, the machine learning model is adjusted to minimize errors in the inferences generated in 906. The degree of error is determined based on ground truth information for the training data obtained at 902 and ground truth information for the artificial representations in 904. As indicated earlier, adjusting a machine learning model may involve changing a weight and/or bias value, through back-propagation, to minimize a loss function.

The processing in FIG. 9 can be repeated until the machine learning model converges to a configuration that provides a threshold level of accuracy. Additionally, in some implementations, the machine learning model is over-trained on a specific class of object, surface, deformation, or anomaly. For instance, the object detection module 428 can be trained on one specific type of tire track (e.g., tracks made by the vehicle or vehicles that typically travel in a particular work site). Training on one specific class enables the machine learning model to produce accurate results in response to subtle variations in the specific class.

Figure 10:
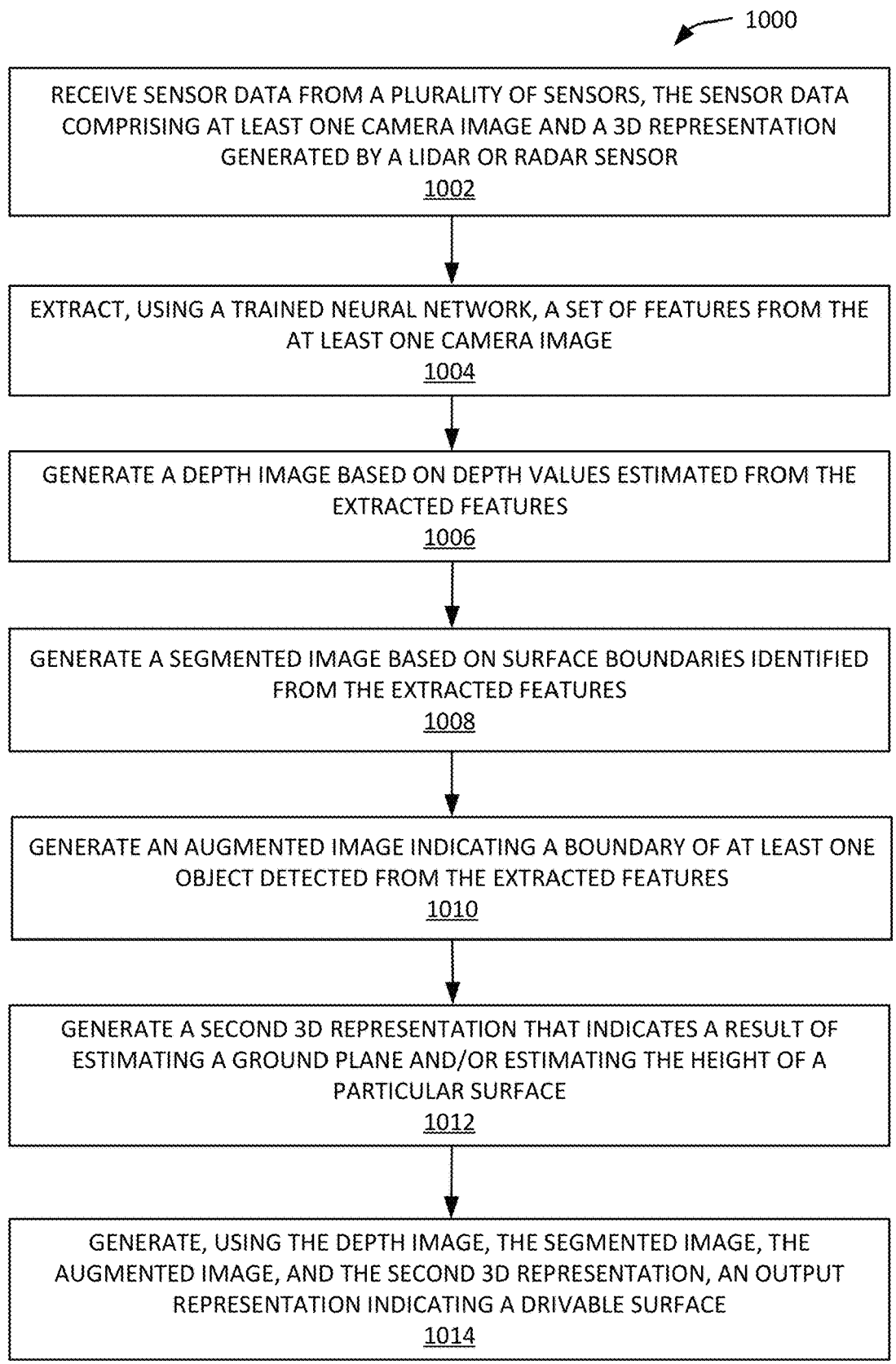
FIG. 10 is a flow chart illustrating a process for identifying a drivable surface according to certain embodiments.

FIG. 10 is a flow chart illustrating a process 1000 for identifying a drivable surface according to certain embodiments. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10 and described below is intended to be illustrative and non-limiting. Although FIG. 10 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 3, the processing depicted in FIG. 10 may be performed by a perception subsystem (e.g., perception subsystem 300).

At 1002, sensor data is received from a plurality of sensors. The received sensor data comprises at least one camera image and a 3D representation generated by a LIDAR or radar sensor. In some embodiments, multiple 3D representations may be received and processed.

At 1004, a trained neural network (e.g., a feature extractor in the embodiments of FIGS. 4, 7, and 8) is used to extract a set of features from the at least one camera image. In particular, the neural network has been trained to infer values of the set of features from image data.

At 1006, a depth image is generated based on depth values estimated from the features extracted in 1004. For example, described earlier in connection with the embodiment of FIG. 4, the extracted features may be input to a depth estimation module that estimate a depth value for each individual pixel in the depth image, where each pixel corresponds to a location in the physical environment. Thus, each depth value estimated to generate the depth image in 1006 is a value indicating how far away a corresponding real-world location is.

At 1008, a segmented image is generated based on surface boundaries identified from the features extracted in 1004. The segmented image can be generated by a surface segmentation module that identifies, from the values of the extracted features, the boundaries of surfaces in the physical environment. The identified boundaries can include boundaries of drivable surfaces as well as boundaries of non-drivable surfaces. The segmented image is an image divided into different regions, each region corresponding to an identified boundary of a surface in the physical environment.

At 1010, an augmented image is generated based on the results of object detection performed, for example, by object detection module 428, object detection module 728, or deformation detection module 828. The object detection detects objects that belong to particular classes in a plurality of predefined object classes. In the case of deformation detection module 828, the objects being detected specifically include objects corresponding to surface deformations or anomalies. As indicated earlier, such deformations or anomalies can serve as indicators of whether or not a surface is drivable. The augmented image can be an image that is augmented to indicate a location of each detected object, for example, by drawing a boundary around the detected object, as shown in the example of FIG. 5.

At 1012, a second 3D representation is generated using the first 3D representation that was received in 1002. The second 3D representation indicates a result of estimating a ground plane and/or estimating a height of a particular surface in the physical environment. For instance, the second 3D representation could be a point cloud augmented with a 2D plane representing the ground. As another example, the second 3D representation could be a voxel grid or occupancy grid indicating the heights of different grid locations.

At 1014, an output representation is generated using the depth image, the segmented image, the augmented image, and the second 3D representation. The output representation is a 3D (true 3D or quasi-3D) representation indicating a drivable surface in the physical environment. As discussed earlier, an output representation can be further processed to confirm the presence of drivable surfaces, for example, by applying a set of rules for evaluating a likelihood that a surface is drivable based on the presence or absence of certain attributes of the surface. Accordingly, in some embodiments, the output representation generated at 1014 is used by a planning subsystem to identify and select a surface as a candidate surface for inclusion in a path from a first location in the physical environment to a second location in the physical environment. The planning subsystem may select the surface based on the surface being indicated by the output representation as being drivable or potentially drivable (e.g., selecting a road leading to the second location). After selecting the surface, the planning subsystem may then apply the set of rules to confirm whether the surface is drivable or not. If the surface is drivable, the planning subsystem can choose to include the surface in a plan of action, e.g., so that an autonomous vehicle will autonomously navigate itself along a path at least partially located on the drivable surface.

Figure 11:
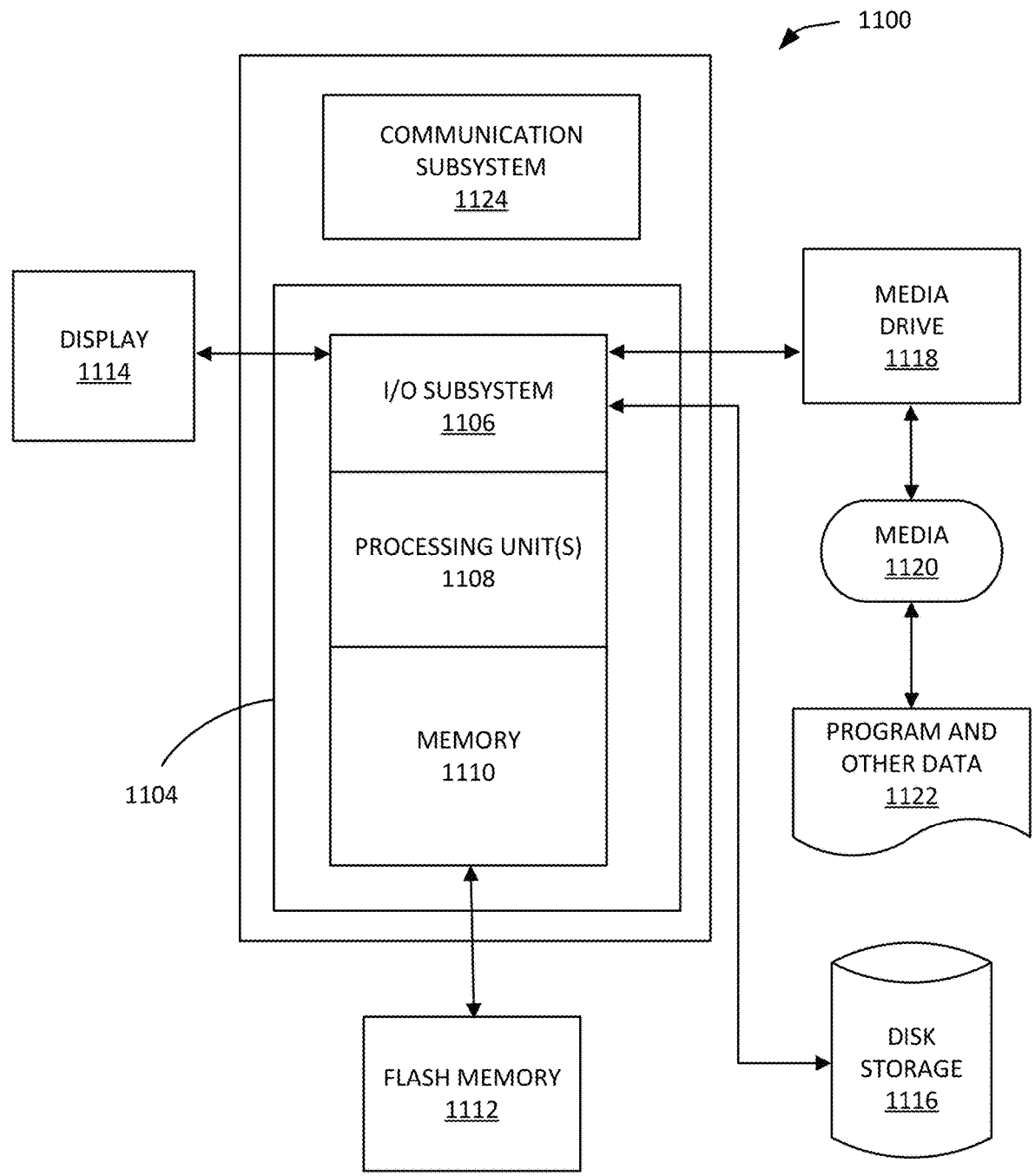
FIG. 11 depicts a simplified block diagram of an exemplary computing system that can be used to implement one or more of the systems and subsystems described in this disclosure and/or to perform any one of the processes or methods described herein.

FIG. 11 depicts a simplified block diagram of an exemplary computing system 1100 that can be used to implement one or more of the systems and subsystems described in this disclosure and/or to perform any one of the processes or methods described herein. For example, in embodiments where autonomous vehicle management system 122 is implemented in software, the software may be executed by a computing system such as computing system 1100 depicted in FIG. 11. Computing system 1100 may include, for example, a processor, memory, storage, and I/O devices (e.g., a monitor, a keyboard, a disk drive, an Internet connection, etc.). In some instances, computing system 1100 may also include other components, circuitry, or other specialized hardware for carrying out specialized functions. In some operational settings, computing system 1100 may be configured as a system that includes one or more units, each of which is configured to carry out some aspects of the processes either in software only, hardware only, or some combination thereof. Computing system 1100 can be configured to include additional systems in order to fulfill various functionalities.

As depicted in embodiment in FIG. 11, computing system 1100 includes one or more processing units 1108, a set of memories (including system memory 1110, computer-readable media 1120, and disk storage 1116), and an I/O subsystem 1106. These components may be communicatively coupled to each other via a bus subsystem that provides a mechanism for the various systems and subsystems of computing system 1100 to communicate with each other as intended. The bus subsystem can be any of several types of bus structures including a memory bus or memory controller, a peripheral bus, a local bus using any of a variety of bus architectures, and the like. In some embodiments, components 1106, 1108 and 1110 may be located on a motherboard 1104.

Processing units 1108 may include one or more processors. The processors may be single or multicore processors. Processor units 1108 can also be implemented using customized circuits, such as application specific integrated circuits (ASICs), or field programmable gate arrays (FPGAs). The processors are configured to execute instructions (e.g., programs, code, etc.) stored in the various memories, such as in system memory 1110, on computer readable storage media 1120, or on disk 1116. The programs or processes may be executed sequentially or in parallel. In certain embodiments, computing system 1100 may provide a virtualized computing environment executing one or more virtual machines. In such embodiments, one or more processors or cores of processors may be allocated to each virtual machine. In some embodiments, a processing unit 1108 may include special purpose co-processors such as graphics processors (GPUs), digital signal processors (DSPs), or the like.

The set of memories can include one or more non-transitory memory devices, including volatile and non-volatile memory devices. Software (programs, code modules, instructions) that, when executed by one or more processors of the processing unit(s) 1108 provide the functionality described herein, may be stored in one or more of the memories. Flash memory 1112 may also be included in certain embodiments. System memory 1110 may include a number of memories including a volatile main random access memory (RAM) (e.g., static random access memory (SRAM), dynamic random access memory (DRAM), and the like) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by the processing unit(s) 1108.

Executable code, program instructions, applications, and program data may be loaded into system memory 1110 and executed by one or more processors of processing unit(s) 1108. One or more operating systems may also be loaded into system memory 1110. Examples of operating systems include, without limitation, different versions of Microsoft Windows®, Apple Macintosh®, Linux operating systems, and/or mobile operating systems such as iOS, Windows® Phone, Android® OS, BlackBerry® OS, Palm® OS operating systems, and others.

In certain embodiments, programming modules and instructions, data structures, and other data (collectively 1122) that are used to provide the functionality of some embodiments may be stored on computer-readable media 1120. A media drive 1118 connected to computing system 1100 may be provided for reading information from and/or writing information to computer-readable media 1120. Computer-readable media 1120 may include non-volatile memory such as a magnetic disk drive, an optical disk drive such as a CD ROM, DVD, a Blu-Ray® disk, or other optical media, Zip® drives, various types of memory cards and drives (e.g., a USB flash drive, SD cards), DVD disks, digital video tape, solid-state drives (SSD), and the like.

I/O subsystem 1106 may include devices and mechanisms for inputting information to computing system 1100 and/or for outputting information from or via computing system 1100. In general, use of the term input device is intended to include all possible types of devices and mechanisms for inputting information to computing system 1100. Input mechanisms may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, cameras, digital camcorders, portable media players, webcams, image scanners, fingerprint scanners, barcode readers, and the like. In general, use of the term output device is intended to include all possible types of devices and mechanisms for outputting information from computing system 1100 to a user or other computer. Such output devices may include one or more types of displays, indicator lights, or non-visual displays such as audio output devices, printers, speakers, headphones, voice output devices, etc. I/O subsystem 1106 may also include interfaces to input and/or output devices external to the I/O subsystem 1106, such as a display 1114.

Computing system 1100 may include a communications subsystem 1124 that provides an interface for computing system 1100 to communicate (e.g., receive data, send data) with other computer systems and networks. Communication subsystem 1124 may support both wired and/or wireless communication protocols. For example, communication subsystem 1124 may enable computing system 1100 to be communicatively coupled with remote sensors, with a network such as the Internet, and the like. Various different communication protocols and formats may be used for the communications such Wi-Fi, Bluetooth® (and/or other standards for exchanging data over short distances includes those using short-wavelength radio transmissions), USB, Ethernet, cellular, an ultrasonic local area communication protocol, etc.

Computing system 1100 can be one of various types, including a mobile device (e.g., a cellphone, a tablet, a PDA, etc.), a personal computer, a workstation, or any other data processing system. Due to the ever-changing nature of computers and networks, the description of computer system 1100 depicted in FIG. 11 is intended only as a specific example. Many other configurations having more or fewer components than the system depicted in FIG. 11 are possible.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (PHP, JavaScript, XML). It is noted that JavaScript has been used as an example in several embodiments. However, in other embodiments, another scripting language and/or JavaScript variants can be utilized as well.

The described features, structures, or characteristics of described in this disclosure may be combined in any suitable manner in one or more embodiments. In the description herein, numerous specific details are provided, such as examples of programming, software modules, user selections, network transactions, database queries, database structures, hardware modules, hardware circuits, hardware chips, etc., to provide a thorough understanding of various embodiments. One skilled in the relevant art will recognize, however, that the features may be practiced without one or more of the specific details, or with other methods, components, materials, and so forth. In other instances, well-known structures, materials, or operations are not shown or described in detail to avoid obscuring novel aspects.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flow charts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by a controller system of an autonomous vehicle, sensor data from a plurality of sensors, the sensor data comprising at least one camera image of a physical environment and a first three-dimensional (3D) representation of the physical environment;
   extracting, by the controller system, a feature vector or tensor from the at least one camera image, the extracting comprising inputting the at least one camera image to a first neural network trained to infer values of the feature vector or tensor from image data;
   estimating, by the controller system and using the values of the feature vector or tensor, depths of different locations in the physical environment;
   generating, by the controller system, a depth image based on the estimated depths;
   generating, by the controller system, a segmented image, the segmented image comprising a plurality of pixels, each pixel having an assigned surface class from a group consisting of a road class and at least one non-road class, wherein generating the segmented image includes inputting the values of the feature vector or tensor to a second neural network trained to assign surface classes to pixels;
   determining, by the controller system, that the physical environment includes at least one object belonging to a particular class in a plurality of object classes, wherein the determining includes inputting the values of the feature vector or tensor to a third neural network trained to detect non-surface objects;
   generating, by the controller system, an augmented image, the augmented image being augmented to indicate a boundary of the at least one object;
   estimating, by the controller system and from the first 3D representation, a ground plane in the physical environment;
   generating, by the controller system and using the first 3D representation, a second 3D representation of the physical environment, the second 3D representation indicating a result of the estimating of the ground plane in the physical environment;
   generating, by the controller system and using the depth image, the segmented image, the augmented image, and the second 3D representation, an output representation indicating a probability that a particular surface in the physical environment is a drivable surface, wherein generating the output representation includes inputting the depth image, the segmented image, the augmented image, and the second 3D representation to a fourth neural network trained to infer values of the output representation using training data that includes a combination of two-dimensional and three-dimensional representations;
   applying, by the controller system, a set of rules to the output representation, the set of rules including at least one condition relating to an attribute of the particular surface in the output representation and an attribute of the autonomous vehicle;
   identifying, by the controller system and based in part on applying the set of rules and in part on the probability indicated in the output representation exceeding a threshold, a drivable surface for the autonomous vehicle;
   determining, by the controller system and based on the output representation, a plan of action for the autonomous vehicle, the plan of action involving autonomously navigating a path from a first location in the physical environment to a second location in the physical environment, wherein the path is at least partially located on the drivable surface; and
   executing, by the controller system, the plan of action.

2. The method of claim 1, wherein the segmented image includes a region corresponding to an identified boundary of the drivable surface.

3. The method of claim 1, wherein the at least one object includes an object located on the drivable surface.

4. The method of claim 1, wherein one or both of the second or third neural networks is trained using images of surface deformations associated with drivable surfaces.

5. The method of claim 4, wherein the images of surface deformations associated with drivable surfaces include images of impressions made by vehicles traversing drivable surfaces.

6. The method of claim 1, wherein one or both of the second or third neural networks is trained using images of surface deformations associated with non-drivable surfaces.

7. The method of claim 6, wherein the images of surface deformations associated with non-drivable surfaces include images of cracks, rocks, debris, or pools of liquid.

8. The method of claim 1, wherein the drivable surface at least partially overlaps with the ground plane.

9. The method of claim 1, wherein the second 3D representation further comprises a grid in which a height of the particular surface in the physical environment is indicated by values assigned to grid locations corresponding to locations on the particular surface, and wherein the values assigned to the grid locations are values indicating that the grid locations are physically occupied or values indicating an estimated height of the particular surface at each grid location.

10. The method of claim 1, wherein the second 3D representation is a voxel grid, and wherein the generating of the second 3D representation comprises inputting the first 3D representation to a neural network trained to infer whether a particular voxel in the voxel grid corresponds to a road surface.

11. The method of claim 1, further comprising:
   identifying, by the controller system and using the values of the feature vector or tensor, an edge represented in the at least one camera image, wherein the identified edge corresponds to an edge of the at least one object or an edge of the drivable surface.

12. The method of claim 1, wherein the at least one condition includes one or more of:
   the particular surface having at least a threshold width, the threshold width defined based on a width of the autonomous vehicle; or
   the particular surface being less steep than a threshold incline navigable by the autonomous vehicle.

13. The method of claim 1, wherein estimating the depths of different locations in the physical environment includes inputting the values of the feature vector or tensor to a fifth neural network trained to infer depth values using training images that depict surfaces or objects at different distances from a camera.

14. A system comprising:
   a plurality of sensors; and
   a controller system coupled to the plurality of sensors, the controller system configured to perform processing comprising:
      receiving sensor data from a plurality of sensors, the sensor data comprising at least one camera image of a physical environment and a first three-dimensional (3D) representation of the physical environment;
      extracting a feature vector or tensor from the at least one camera image, the extracting comprising inputting the at least one camera image to a first neural network trained to infer values of the feature vector or tensor from image data;
      estimating, using the values of the feature vector or tensor, depths of different locations in the physical environment;
      generating a depth image based on the estimated depths;
      generating a segmented image, the segmented image comprising a plurality of pixels, each pixel having an assigned surface class from a group consisting of a road class and at least one non-road class, wherein generating the segmented image includes inputting the values of the feature vector or tensor to a second neural network trained to assign surface classes to pixels;
      determining that the physical environment includes at least one object belonging to a particular class in a plurality of object classes, wherein the determining includes inputting the values of the feature vector or tensor to a third neural network trained to detect non-surface objects;
      generating an augmented image, the augmented image being augmented to indicate a boundary of the at least one object;
      estimating, from the first 3D representation, a ground plane in the physical environment;
      generating, using the first 3D representation, a second 3D representation of the physical environment, the second 3D representation indicating a result of the estimating of the ground plane in the physical environment;
      generating, using the depth image, the segmented image, the augmented image, and the second 3D representation, an output representation indicating a probability that a particular surface in the physical environment is a drivable surface, wherein generating the output representation includes inputting the depth image, the segmented image, the augmented image, and the second 3D representation to a fourth neural network trained to infer values of the output representation using training data that includes a combination of two-dimensional and three-dimensional representations;
      applying a set of rules to the output representation, the set of rules including at least one condition relating to an attribute of the particular surface in the output representation and an attribute of an autonomous vehicle;
      identifying, by the controller system and based in part on applying the set of rules and in part on the probability indicated in the output representation exceeding a threshold, a drivable surface for the autonomous vehicle;
      determining, based on the output representation, a plan of action for the autonomous vehicle, the plan of action involving autonomously navigating a path from a first location in the physical environment to a second location in the physical environment, wherein the path is at least partially located on the drivable surface; and
      executing the plan of action.

15. The system of claim 14, wherein one or both of the second or third neural networks has been trained using images of surface deformations associated with drivable surfaces.

16. The system of claim 15, wherein the images of surface deformations associated with drivable surfaces include images of impressions made by vehicles onto drivable surfaces.

17. The system of claim 14, wherein one or both of the second or third neural networks has been trained using images of surface deformations associated with non-drivable surfaces.

18. The system of claim 17, wherein the images of surface deformations associated with non-drivable surfaces include images of cracks, rocks, debris, or pools of liquid.

19. The system of claim 14, wherein the plurality of sensors includes a LIDAR or radar sensor configured to generate the first 3D representation as a point cloud.

20. The system of claim 19, wherein the controller system is further configured such that estimating the ground plane includes performing principal component analysis on the point cloud.

* * * * *